US011641437B2

(12) United States Patent
Sasaki et al.

(10) Patent No.: US 11,641,437 B2
(45) Date of Patent: May 2, 2023

(54) IMAGE READING APPARATUS COMPRISING CORRECTION OF AN IMAGE BY USING A CONVERTED TIME-SERIES COMPONENT CONVERTED FROM A FREQUENCY COMPONENT EXTRACTED FROM A READ PATTERN THAT IS OUTSIDE OF A REGION IN WHICH AN ORIGINAL IS PLACED

(71) Applicant: CANON KABUSHIKI KAISHA, Tokyo (JP)

(72) Inventors: Yuhi Sasaki, Ibaraki (JP); Koichi Tanaka, Chiba (JP); Jiro Shirakata, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/681,657

(22) Filed: Feb. 25, 2022

(65) Prior Publication Data
US 2022/0321725 A1 Oct. 6, 2022

(30) Foreign Application Priority Data

Mar. 31, 2021 (JP) .............................. JP2021-060506

(51) Int. Cl.
*H04N 1/047* (2006.01)
*H04N 1/053* (2006.01)
*H04N 1/12* (2006.01)
*H04N 1/028* (2006.01)

(52) U.S. Cl.
CPC ........... *H04N 1/053* (2013.01); *H04N 1/1235* (2013.01)

(58) Field of Classification Search
CPC .. H04N 1/053; H04N 1/1235; H04N 1/00045; H04N 1/4076; H04N 2201/0005; H04N 2201/0006; H04N 2201/04718; G06T 7/33; G06T 7/001; G06F 17/14; G06F 17/141; G06F 17/142; G06F 17/144; G06F 17/156; H03H 17/0213; H03H 2017/0214
USPC ................. 358/1.5, 1.9, 2.1, 3.27, 504, 518; 382/280
See application file for complete search history.

(56) References Cited

U.S. PATENT DOCUMENTS

| 6,122,412 A | 9/2000 | Noguchi et al. ............... 382/312 |
| 9,170,543 B2 * | 10/2015 | Arakawa .............. G06V 10/225 |
| 9,183,434 B2 * | 11/2015 | Muraishi ................... G06T 7/33 |

(Continued)

*Primary Examiner* — Chad Dickerson
(74) *Attorney, Agent, or Firm* — Venable LLP

(57) ABSTRACT

An image reading apparatus includes a transparent member, reading portion, a pattern, and a processor. The processor extracts a frequency component in an image of the pattern read by the reading portion in a period in which the reading portion reads an image of an original placed on the transparent member while moving in a first direction. The processor calculates a frequency component from the extracted frequency component in another position different from the position, in which the pattern is provided, with respect to the second direction crossing the first direction. The processor converts the calculated frequency component in the above-described another position into a time-series component. The processor corrects an image corresponding to the above-described another position by using the converted time-series component in the above-described another position.

5 Claims, 18 Drawing Sheets

(56) References Cited

U.S. PATENT DOCUMENTS 10,846,839 B2 * 11/2020 Takikawa ................. G06T 5/10
2020/0234423 A1 * 7/2020 Oki ......................... G06T 7/001

* cited by examiner

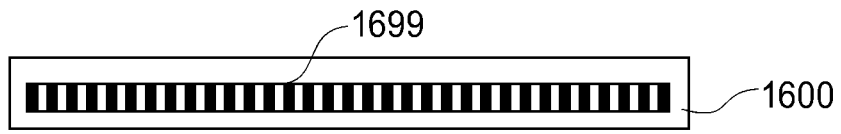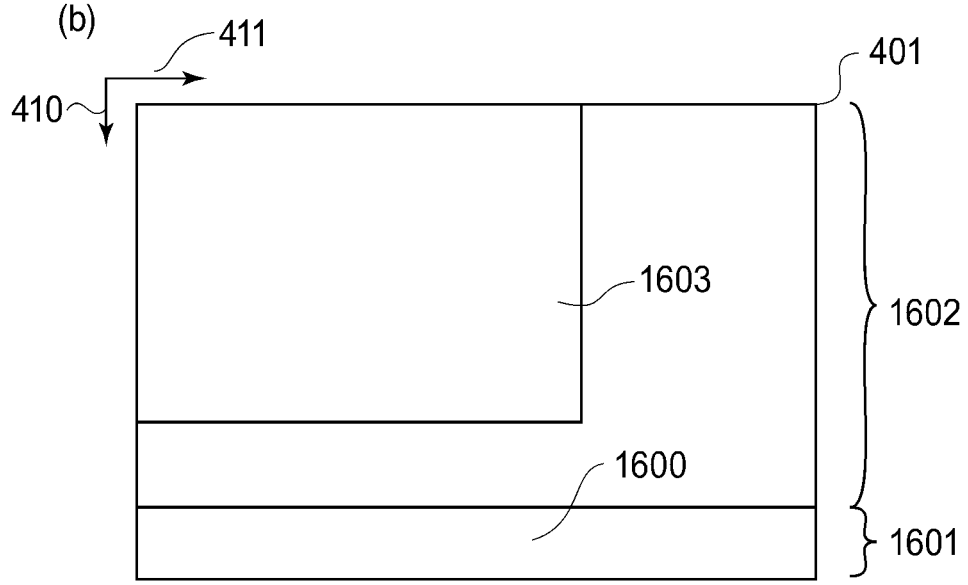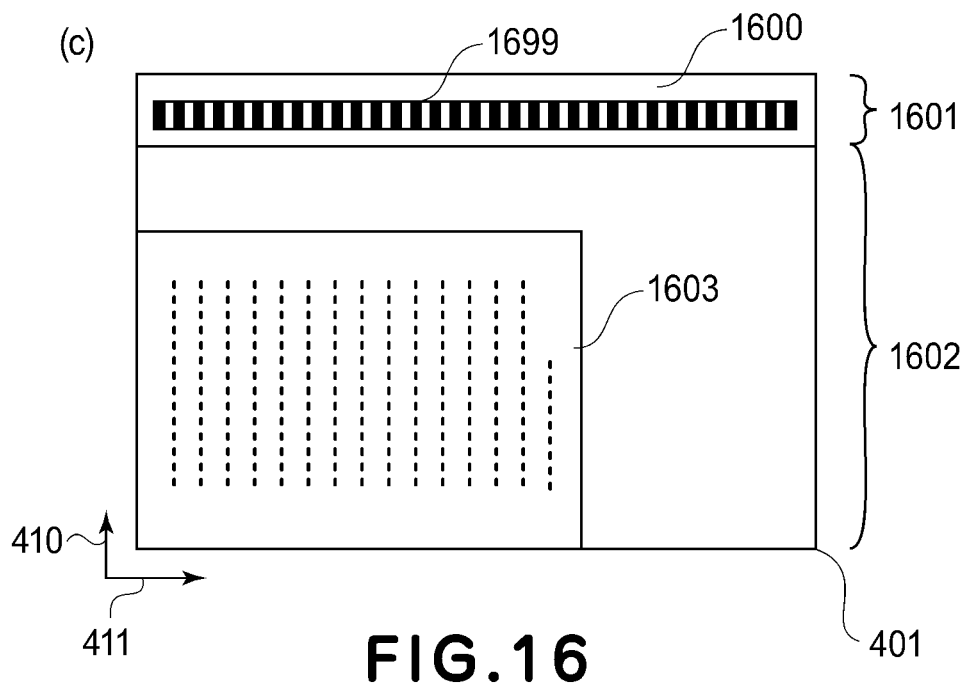
FIG. 16

IMAGE READING APPARATUS COMPRISING CORRECTION OF AN IMAGE BY USING A CONVERTED TIME-SERIES COMPONENT CONVERTED FROM A FREQUENCY COMPONENT EXTRACTED FROM A READ PATTERN THAT IS OUTSIDE OF A REGION IN WHICH AN ORIGINAL IS PLACED

FIELD OF THE INVENTION AND RELATED ART

The present invention relates to an image reading apparatus for correcting a read image.

In an image reading apparatus including an image reading means for reading an image of an original, it has been known that an error in a reading position where the image of the original is read occurs. For example, in a constitution, the image reading means reads the image of the original by scanning the original while moving, due to speed non-uniformity and vibration which occur in the image reading means, the reading position deviates from a proper image position in some instance.

U.S. Pat. No. 6,122,412 discloses that a reference chart (linear encoder or the like) having a scale with regular intervals is provided within a reading region of the image reading means and outside a region in which the original is placed. The image reading means reads the reference chart simultaneously with the image of the original during the scanning of the original while moving. Then, on the basis of a reading result of the reference chart, an error in reading position occurred due to the speed non-uniformity and the vibration of the image reading means is derived, and then is removed from a reading result of the image of the original.

In the method of U.S. Pat. No. 6,122,412, the error in reading position caused due to the vibration generating when the image reading means scans the original while moving cannot be properly corrected in some instances. Specifically, the case where vibration (oscillating vibration) about a supporting point of the image reading means occurs in the image reading means or the like case is applicable thereto. In this case, phases of the oscillating vibration are opposite to each other between one end portion and the other end portion of the image reading means with respect to a main scan direction of the image reading means. For this reason, in the method discloses in U.S. Pat. No. 6,122,412, a result of correction is rather worsened in error as a result. Consequently, a quality of the read image lowers.

SUMMARY OF THE INVENTION

The present invention has been accomplished for solving the above-described problem. A principal object of the present invention is to provide an image reading apparatus capable of suppressing a lowering in quality of an image read by an image reading means.

According to an aspect of the present invention, there is provided an image reading apparatus comprising: a transparent member on which an original is placed; reading means configured to read an image of the original by scanning the original placed on the transparent member while moving the original in a first direction; a pattern provided in a position in which the reading means is capable of reading an image thereof in a second direction crossing the first direction and outside a region in which the original is placed; and a processor configured to: extract a frequency component in the image of the pattern read by the reading means in a period in which the reading means reads the image of the original placed on the transparent member while moving in the first direction; calculate a frequency component from the extracted frequency component in another position different from the position, in which the pattern is provided, with respect to the second direction; convert the calculated frequency component in the another position into a time-series component; and correct an image corresponding to the another position by using the converted time-series component in the another position.

Further features of the present invention will become apparent from the following description of exemplary embodiments with reference to the attached drawings.

Figure 10:
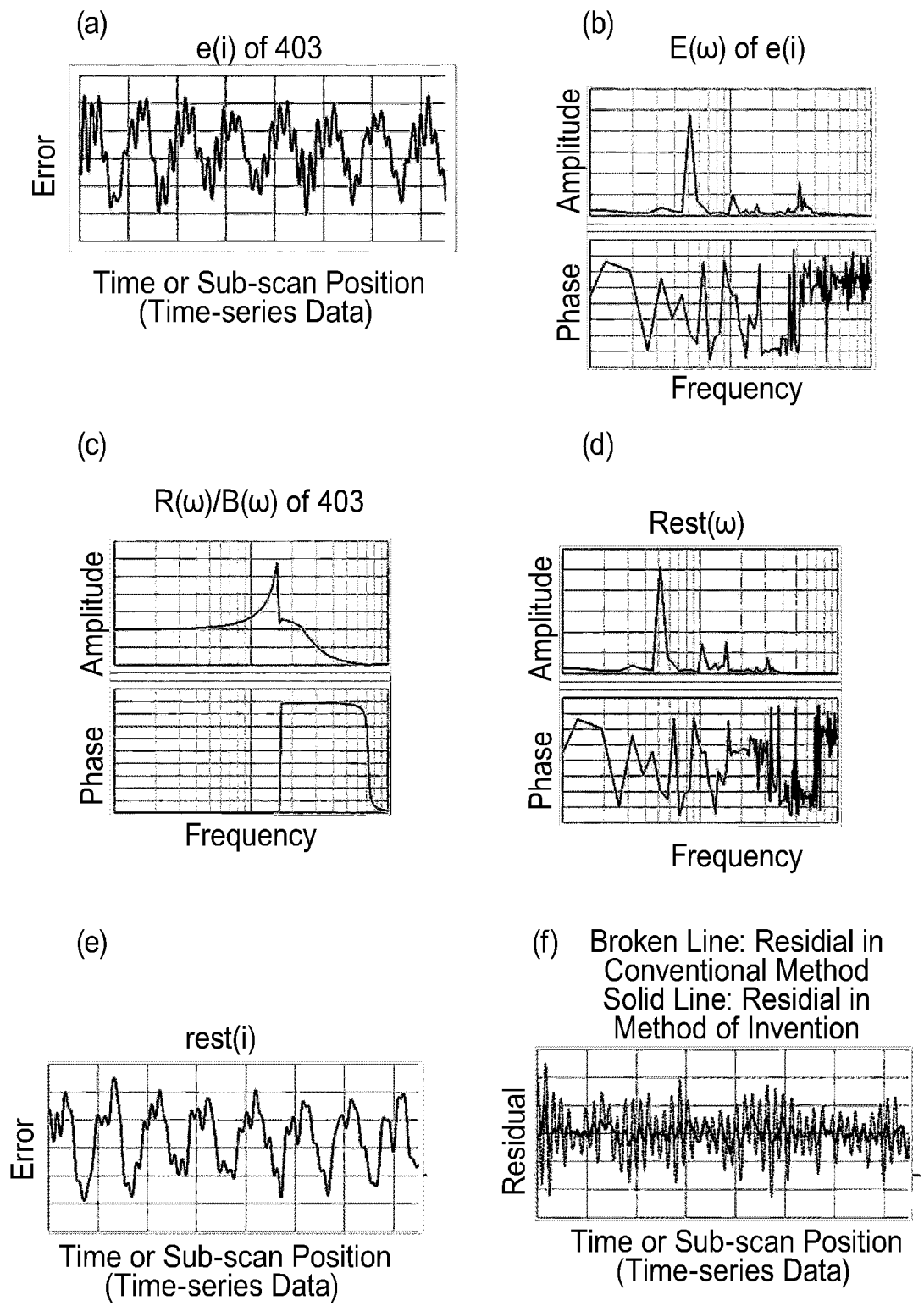

Parts (a) to (f) of FIG. 10 are diagrams showing waveforms of respective data in the first embodiment.

Figure 11:
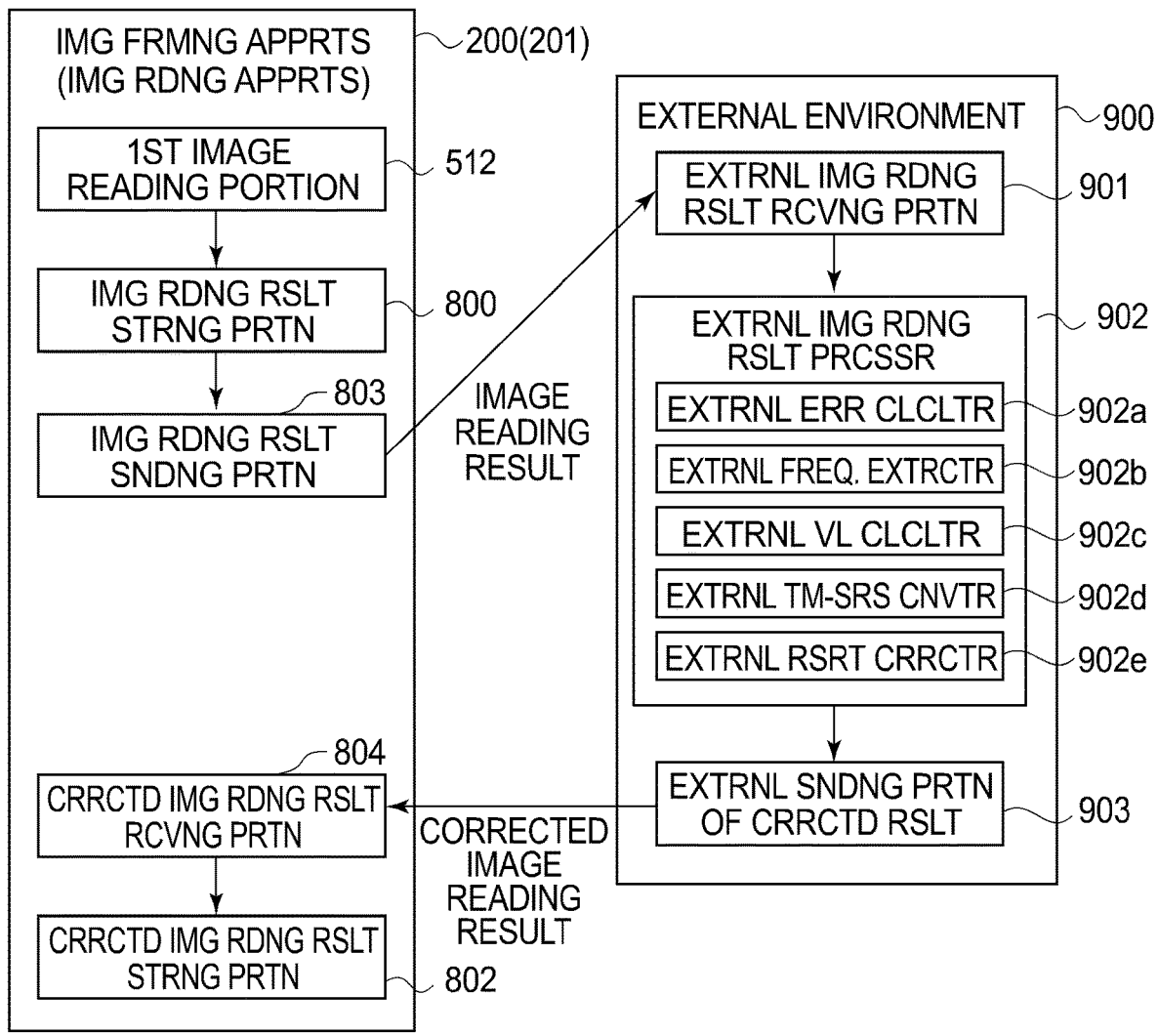

FIG. 11 is a schematic illustration showing a constitution for correcting a reading error of an image reading result in a second embodiment.

Figure 12:
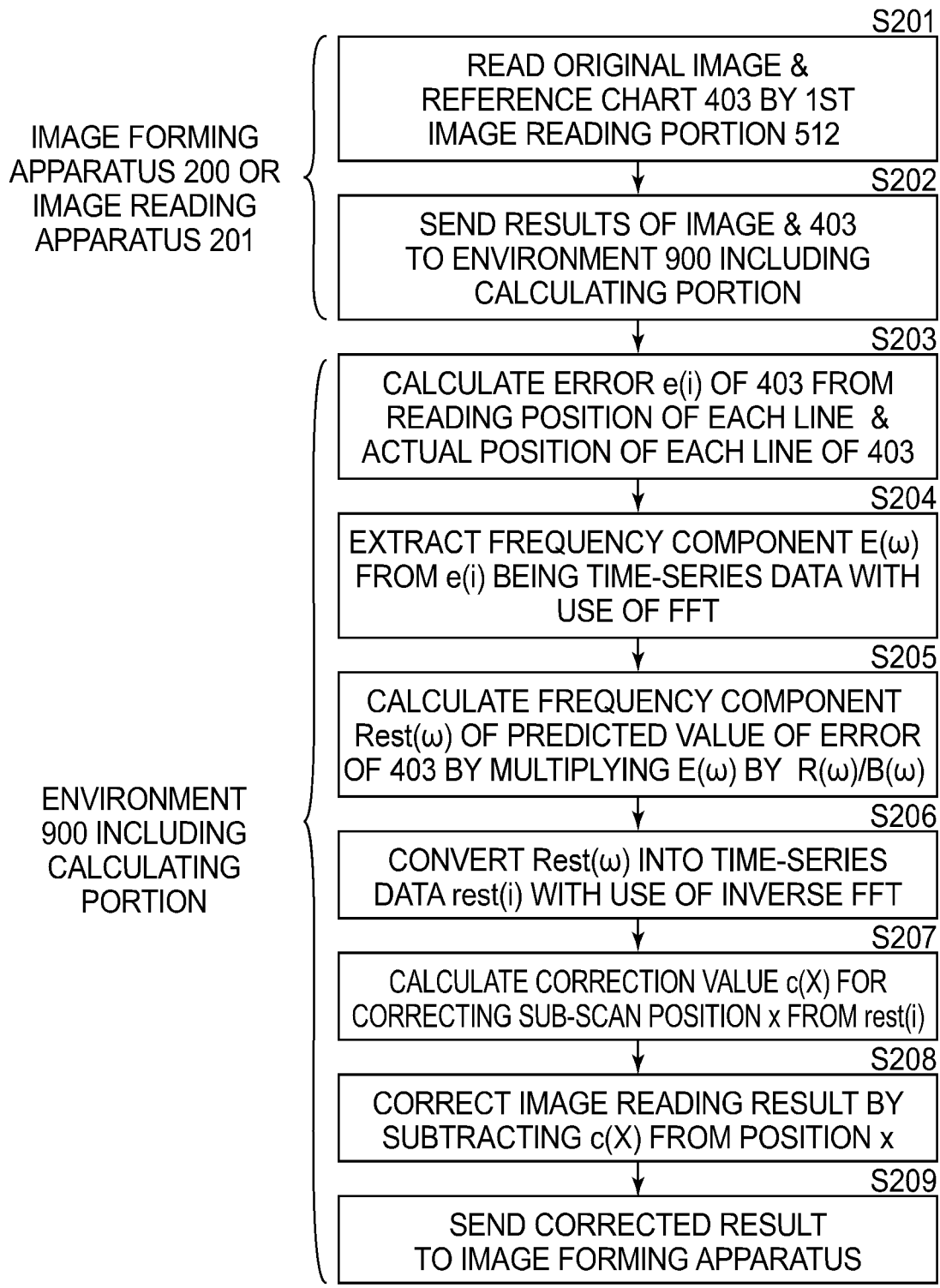

FIG. 12 is a flowchart showing a correcting process of the reading error in the second embodiment.

Figure 13:
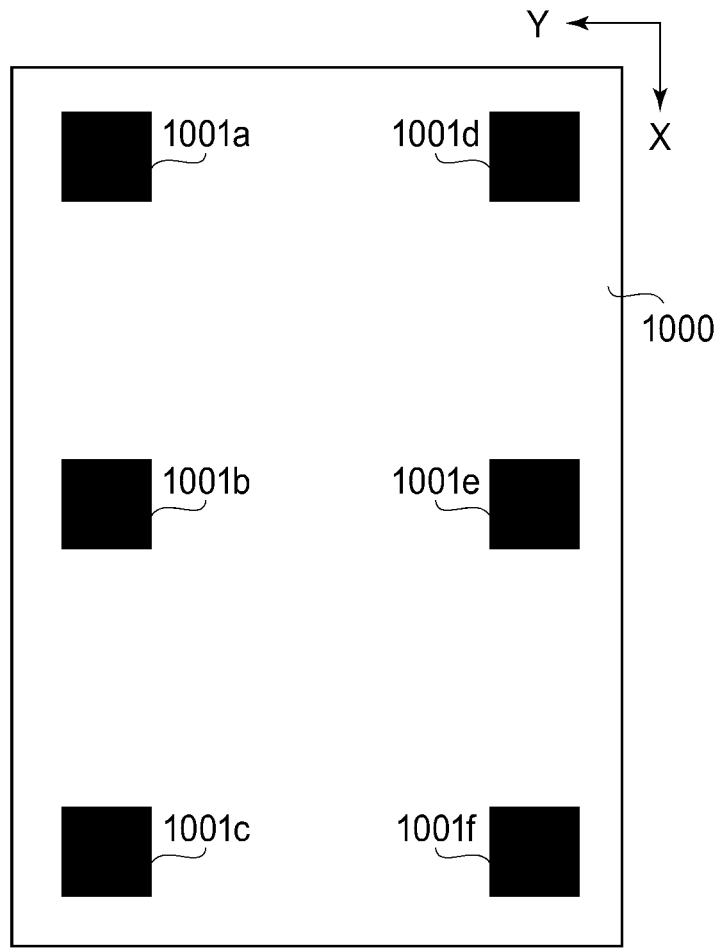

FIG. 13 is a schematic illustration showing a measuring chart printed in a third embodiment.

Figure 14:
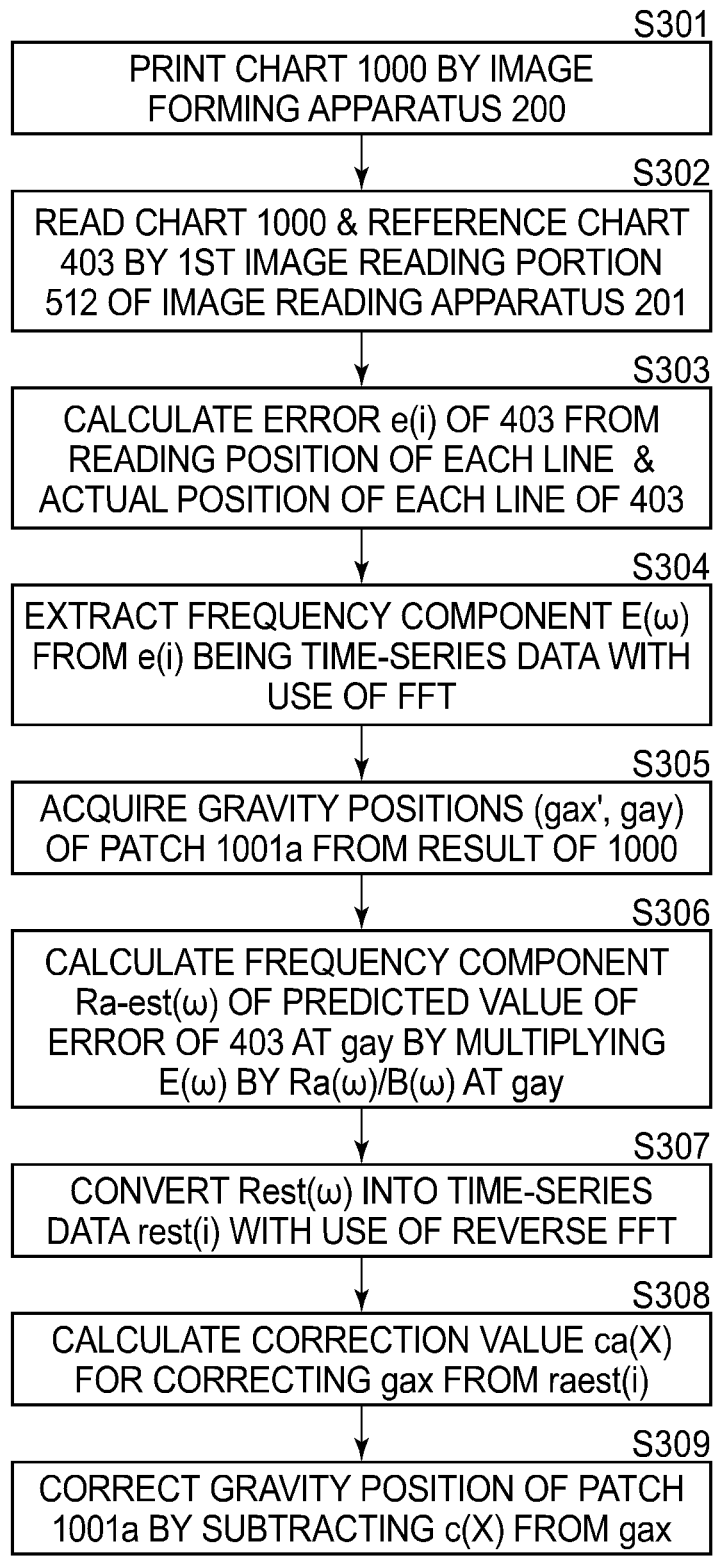

FIG. 14 is a flowchart showing a correcting process of a reading error in an image forming position adjusting operation in the third embodiment.

Figure 15:
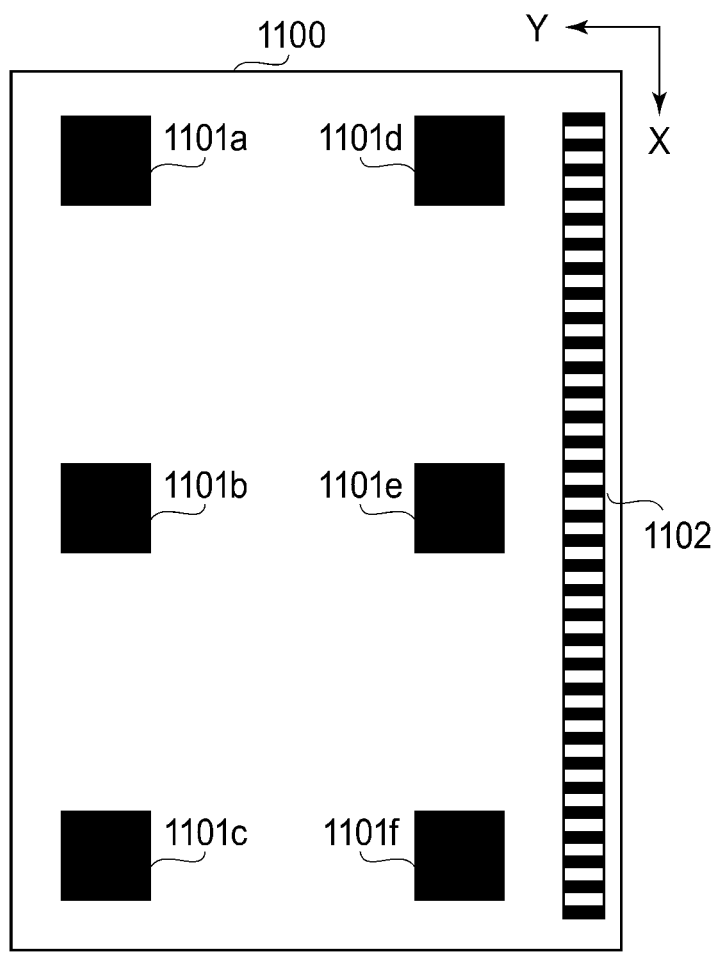

FIG. 15 is a schematic illustration showing a skimming-through measuring chart in a fourth embodiment.

Parts (a), (b) and (c) of FIG. 16 are schematic views for illustrating a reading method of an original in a fifth embodiment.

Figure 17:
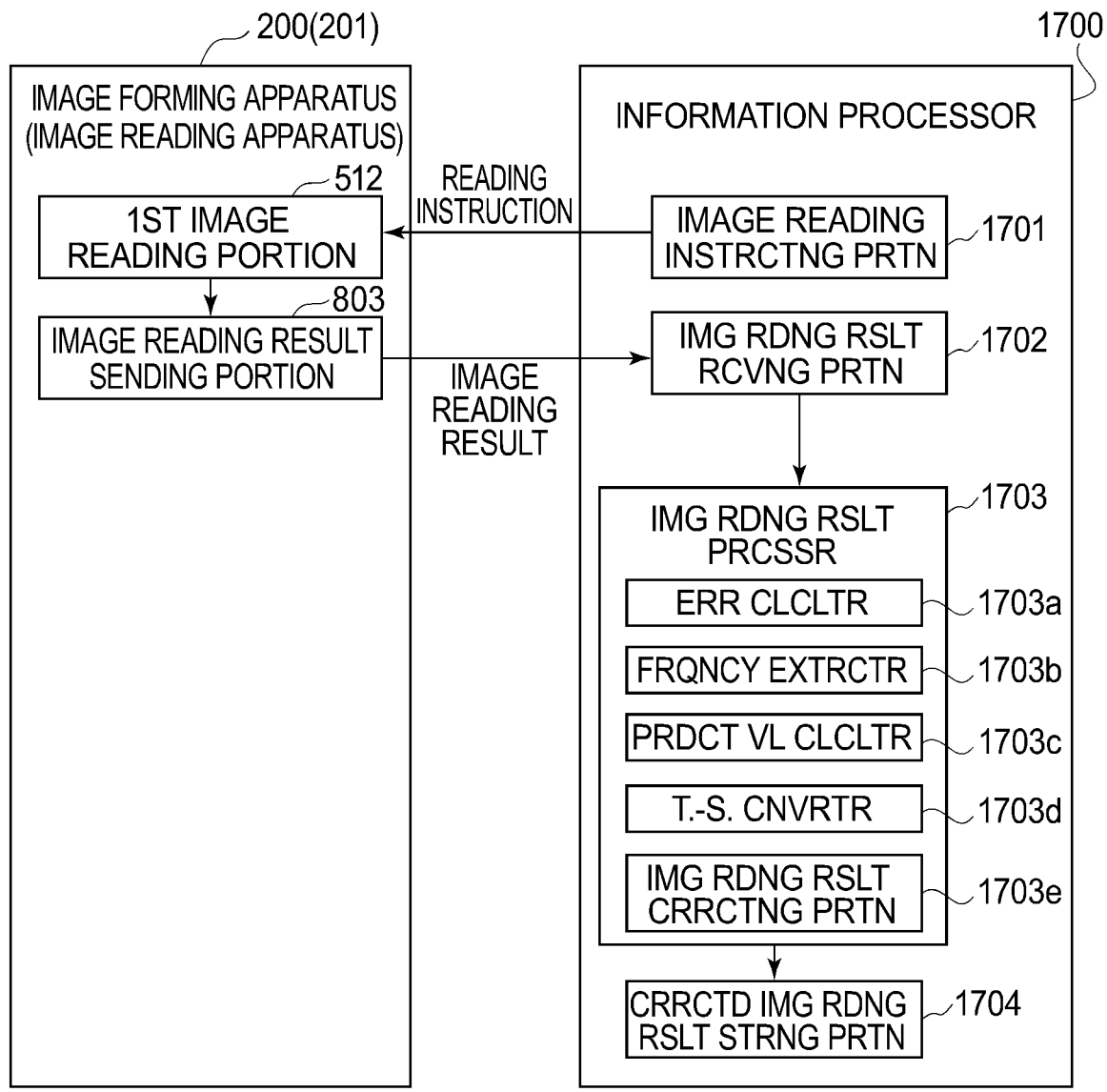

FIG. 17 is a schematic illustration showing a constitution for correcting a reading error of an image reading result in the fifth embodiment.

Figure 18:
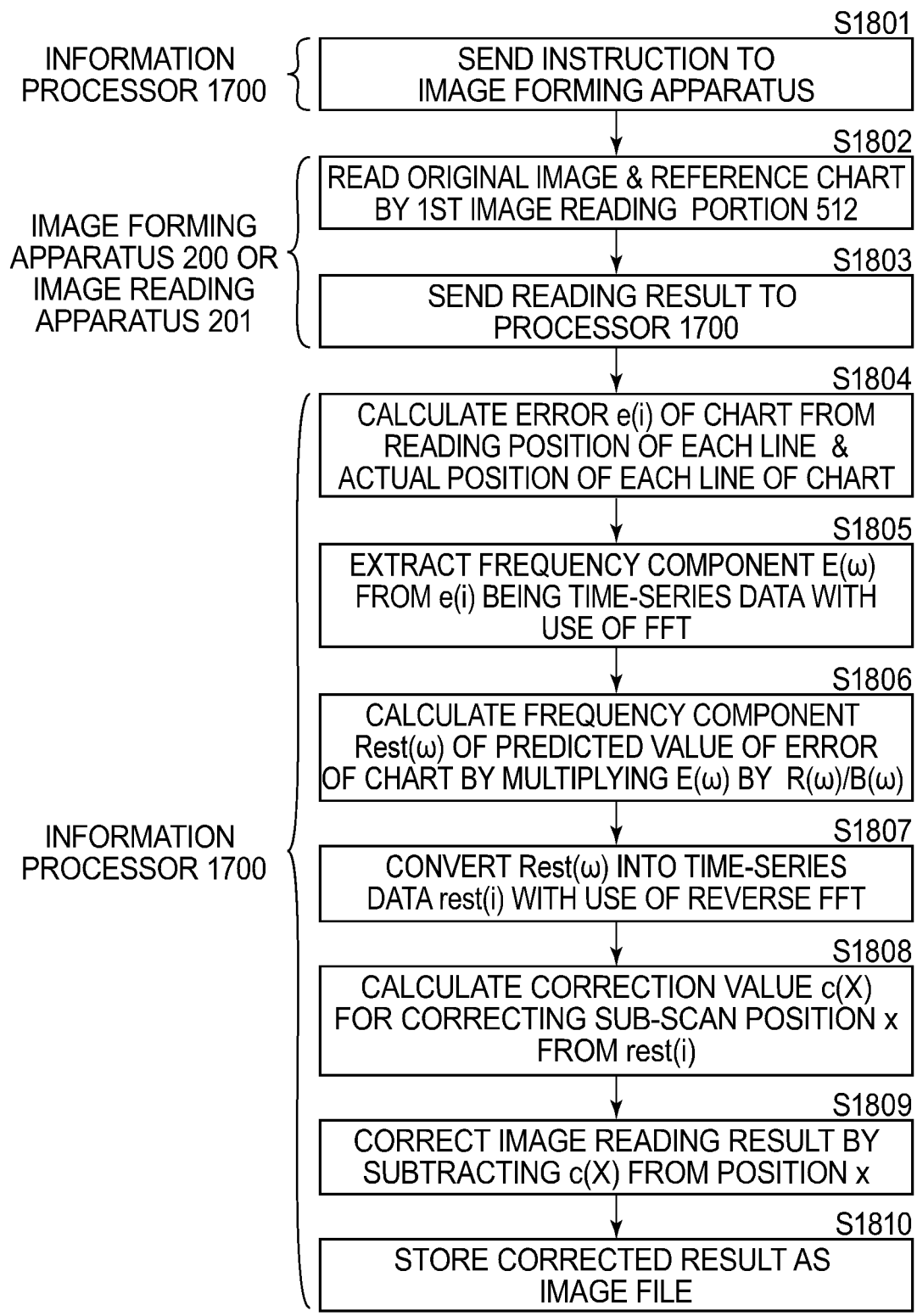

FIG. 18 is a flowchart showing a correcting process of the reading error in the fifth embodiment.

DESCRIPTION OF THE EMBODIMENTS

In the following, embodiments for carrying out the present invention will be described with reference to the drawings. However, the following embodiments are specific embodiments of the present invention, and do not restrict the technical scope of the present invention.

First Embodiment

Figure 1:
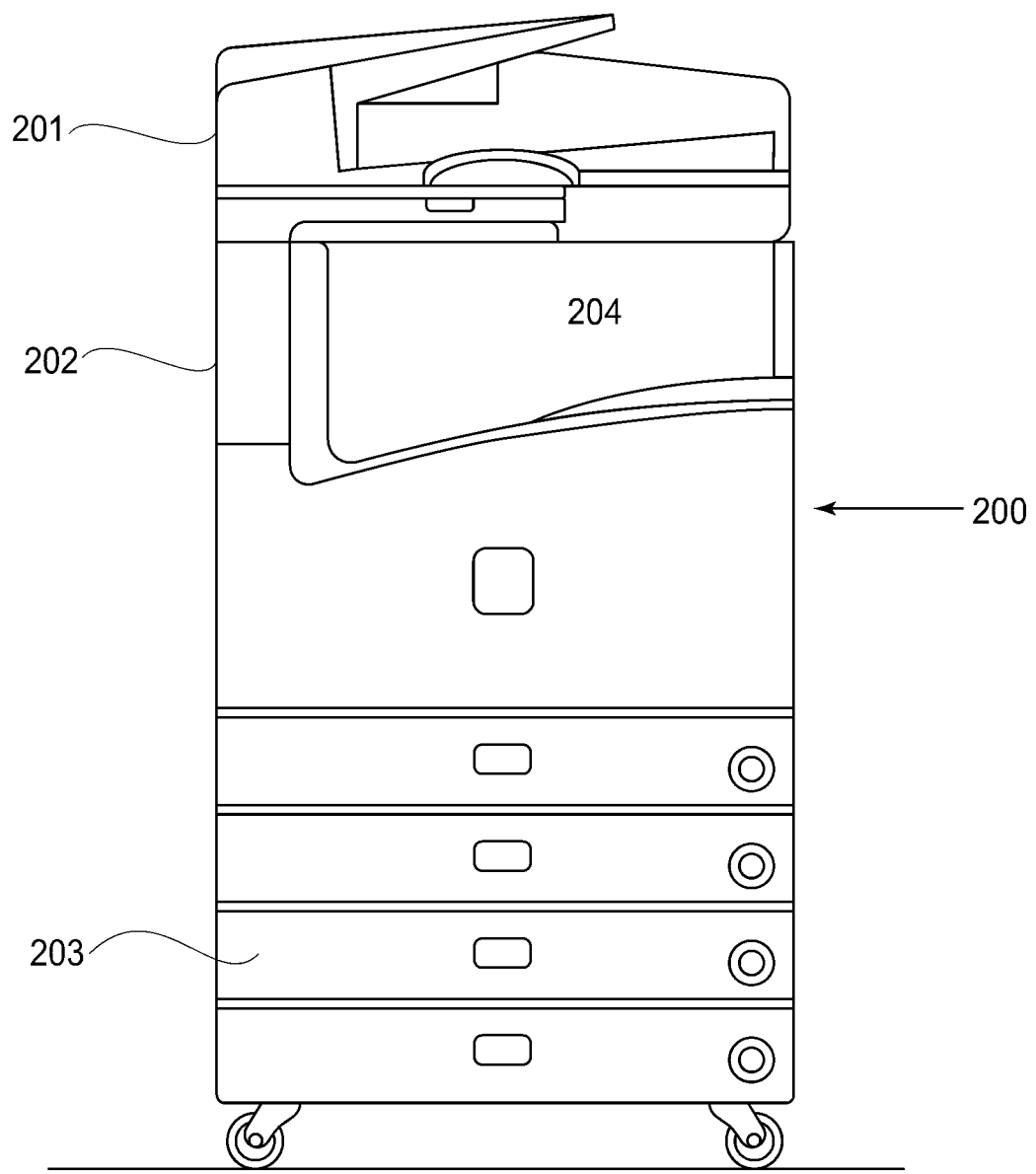
FIG. 1 is a schematic view showing a structure of an image forming apparatus including an image reading apparatus of an embodiment.

FIG. 1 is a schematic view showing an example of a structure of an image forming apparatus including an image reading apparatus according to a first embodiment of the present invention.

First, using FIG. 1, a general structure of an image forming apparatus 200 including an image reading apparatus 201 of this embodiment will be described. Incidentally, the image forming apparatus 200 is merely an example in the embodiment of the present invention, and a facsimile apparatus, an ink jet printer, a multi-function machine, and the like which includes the image reading apparatus 201 also corresponds to the image reading apparatus 201 according to the present invention.

As shown in FIG. 1, the image forming apparatus includes an image forming portion main assembly 202, sheet (paper) feeding cassettes 203 mounted at a lower portion of the image forming portion main assembly 202, the image reading apparatus 201 mounted at an upper portion of the image forming portion main assembly 202. Each of the sheet feeding cassettes 203 is a cassette for stacking recording sheets (papers). This image reading apparatus 201 is an apparatus for reading an image of an original.

In the image forming portion main assembly 202, an image forming portion is disposed at a substantially central portion thereof, and a sheet feeding portion is disposed below the image forming portion. The sheet feeding portion includes the sheet feeding cassettes 203.

Further, above the image forming portion main assembly 202, the image reading apparatus 201 is disposed. The image reading apparatus 201 is provided with a reading portion for reading of the image of the original. The reading portion is constituted by, for example, a reading sensor such as a CCD.

Further, between the image reading apparatus 201 and the image forming portion main assembly 202, a space is provided, and a main assembly sheet discharging portion 204 for discharging and stacking the recording sheets fed by the image forming portion main assembly.

In the image forming portion main assembly 202, the image forming portion is, for example, constituted as a print engine of a conventionally well-known electrophotographic type, and incorporates a laser writing portion, an electrophotographic process portion, a fixing portion, and the like, which are not shown in FIG. 1. The sheet feeding portion is incorporates an unshown feeding roller for separating and feeding the recording sheets stacked in the sheet feeding cassette 203, and feeds the recording sheet to the image forming portion.

Figure 2:
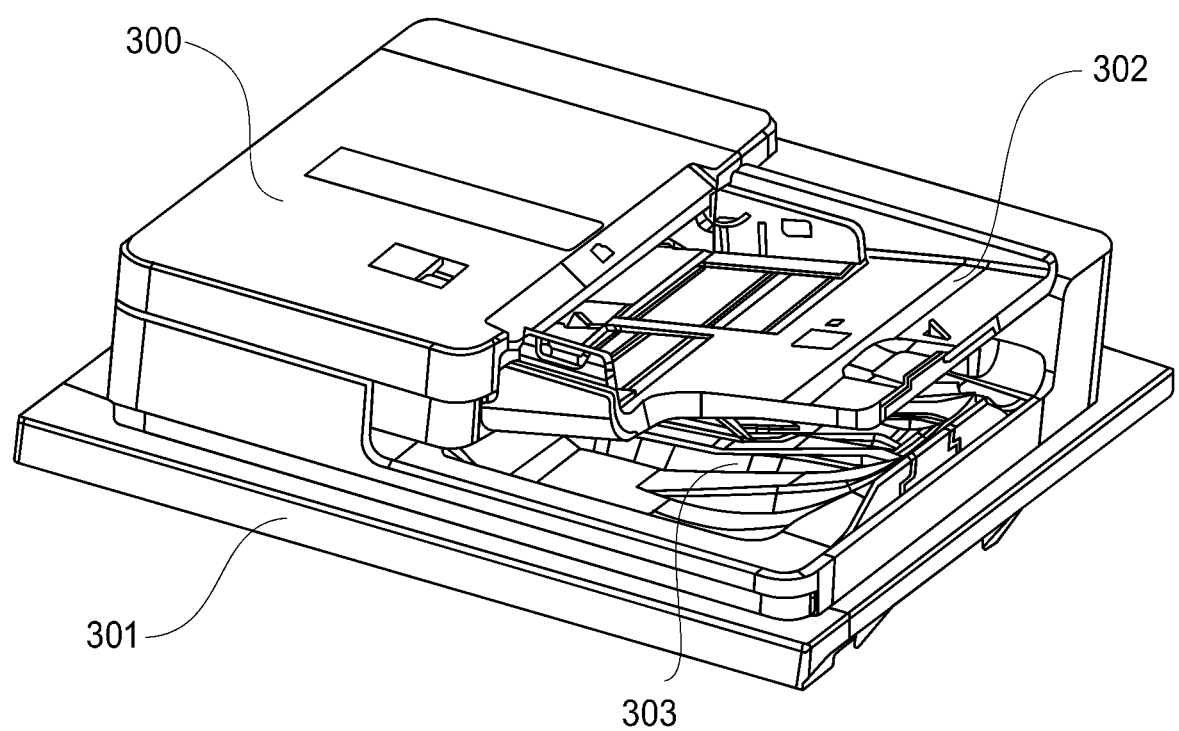
FIG. 2 is a perspective view showing an outline of an automatic original feeding device and a reader which constitute the image reading apparatus.

FIG. 2 is a perspective view showing an example of an outline of an automatic original feeding apparatus (ADF: Auto Document Feeder) 300 and a reader 301 which constitute the image reading apparatus 201.

Figure 3:
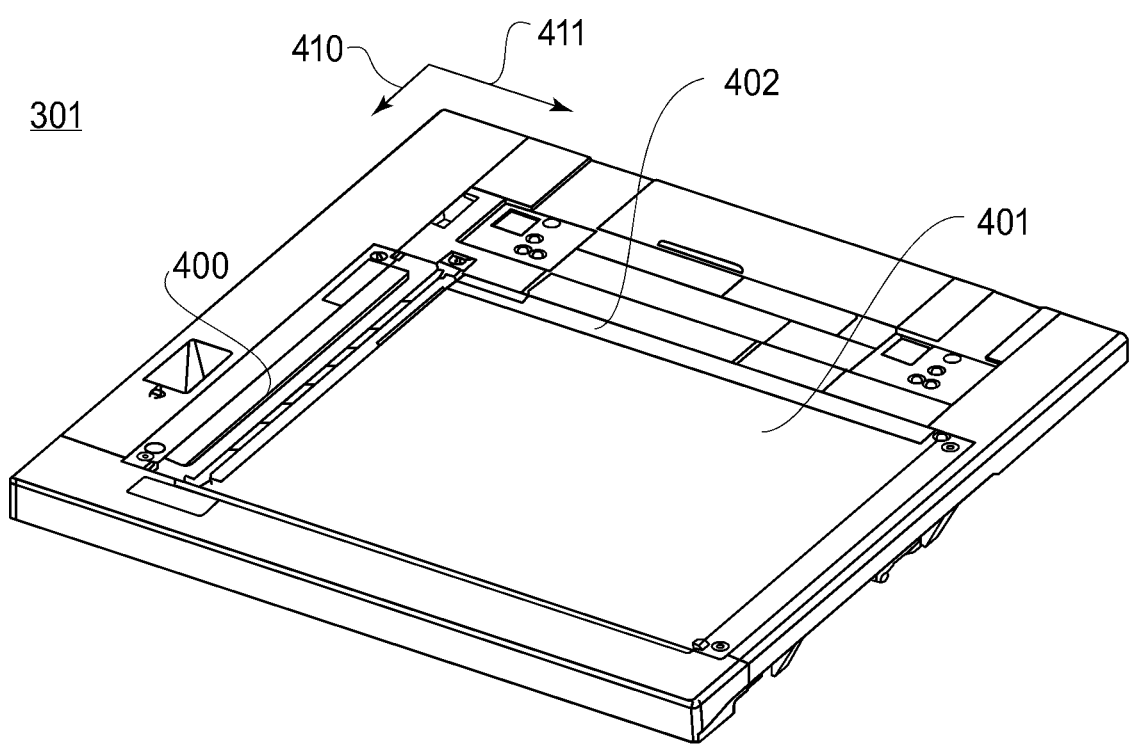
FIG. 3 is a perspective view showing an example of an outline of the reader which is a part of the image reading apparatus.

FIG. 3 is a perspective view showing an example of an outline of the reader 301 which is a part of the image reading apparatus 201.

In the following, using FIGS. 2 and 3, general structures of the ADF 300 and the reader 301 which constitutes the image reading apparatus 201 will be described.

As shown in FIG. 2, the image reading apparatus 201 includes the ADF 300 for separating and feeding a plurality of originals and for reading images printed on the originals.

The ADF 300 is provided with a sheet feeding tray 302 and a sheet discharge tray 100. The sheet feeding tray 302 is a tray for stacking the originals to be fed. The sheet discharging tray 100 is a tray for discharging the originals which are separated and fed from the sheet feeding tray 302 and which are then conveyed. The ADF 300 separates, feeds and conveys the originals placed on the sheet feeding tray 302, and then discharges the originals onto the discharge tray 100.

Below the ADF 300, the reader 301 is provided.

As shown in FIG. 3, the reader 301 reads the image of the original fed by the ADF 300, by way of a first skimming-through glass 400, or reads the image of the original placed on an original supporting platen glass 401 which is an original reading table. Incidentally, the original placed on the original supporting platen glass 401 may be a thick original such as a book or the like. In FIG. 3, an arrow 410 represents a main scan direction, and an arrow 411 represents a sub-scan direction. On a rear side of the original supporting platen glass 401, an original scale 402 extending in the sub-scan direction is provided.

Figure 4:
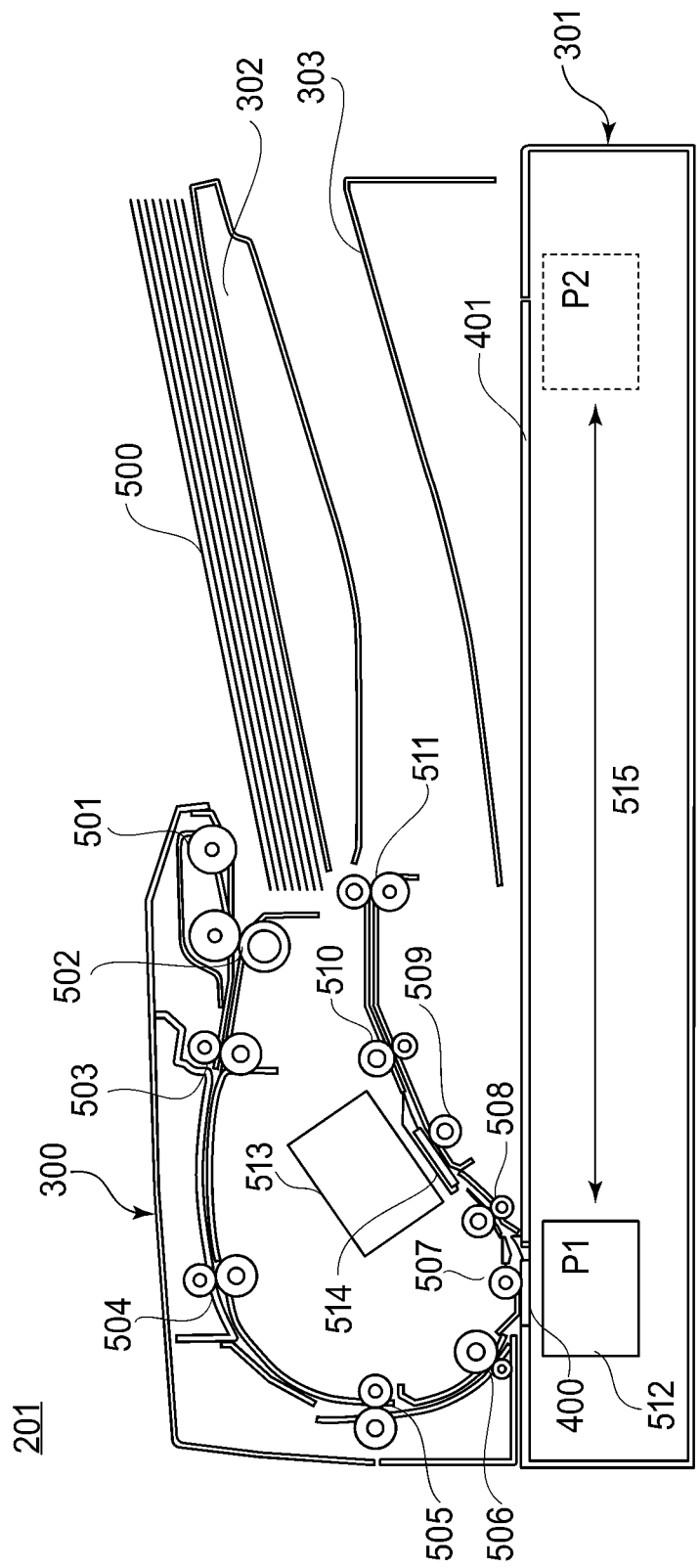
FIG. 4 is a schematic view showing a cross-sectional structure of the image reading apparatus.

FIG. 4 is a sectional view showing an example of a cross-sectional structure of the image reading apparatus 201.

In the following, using FIG. 4, an inside structure of the image reading apparatus 201 will be described.

The ADF 300 is provided with a pick-up roller 501, a separation roller 502, a plurality of feeding rollers 503 to 511. The pick-up roller 501 separates and feeds a plurality of originals (original sheets) 500 stacked on the sheet feeding tray 302. The separation roller 502 separates the originals 500 fed by the pick-up roller 501. The feeding rollers 503 to 511 conveys the original 500 separated and fed by the separation roller 502.

On a side downstream of the separation roller 502, a drawing roller pair 503 for drawing the original 500 fed from the separation roller 502 is provided. Further, on a side downstream of the drawing roller pair 503, a conveying roller pair 504 for conveying the original 500 conveyed by the drawing roller pair 503 is provided. Further, on a side downstream of the conveying roller pair 504, a registration roller pair 505 for correcting oblique movement of the original 500 conveyed by the conveying roller pair 504 is provided.

Further, on a side downstream of the registration roller pair 505, a first lead roller 506 for stably reading the image of the conveyed original 500, a first platen roller 507, a second lead roller 508, a second platen roller 509, and a third lead roller 510 are provided. Further, on a side downstream of the third lead roller 510, a discharging roller pair 511 for discharging the original 500 onto a discharge tray 303 is provided.

Below the ADF 300, the reader 301 is provided.

Inside the reader 301, a first image reading portion 512 is provided. The first image reading portion 512 reads a surface image of the original, fed by the ADF 300, by way of a first skimming-through glass 400. Further, the first image reading portion 512 reads the image of the original placed on the original supporting platen glass 401 by opening and closing the ADF 300.

When the surface image of the original 500 fed by the ADF 300 is read, the first image reading portion 512 is at rest in a skimming-through position P1 which is a position opposing the first skimming-through glass 400. The ADF 300 feeds the original and causes the original to pass through the skimming-through position P1. By this, the first image reading portion 512 is capable of reading the image of the original by scanning the original, fed in the sub-scan direction, in a line-sequential manner at a certain time interval in a state in which the first image reading portion 512 is at rest in the skimming-through position P1.

When the image of the original placed on the original supporting platen glass 401 is read, the first image reading portion 512 moves in a movement scanning direction 515 on a supporting member provided inside the reader 301, and reads the image of the original by scanning the original in the line-sequential manner at the certain time interval. P2 represents a reading end position. Incidentally, the movement scanning direction 515 is the same direction as the sub-scan direction 411 shown in FIG. 3.

Further, inside the ADF 300, in order to read a back-side image of the fed original, a second skimming-through glass 514 and a second image reading portion 513 are provided at positions opposing the platen roller 509. Thus, the first image reading portion 512 and the second image reading portion 513 are disposed between the first lead roller 506 to the third lead roller 510, so that front and back images of the fed original 500 can be read.

Figure 5:
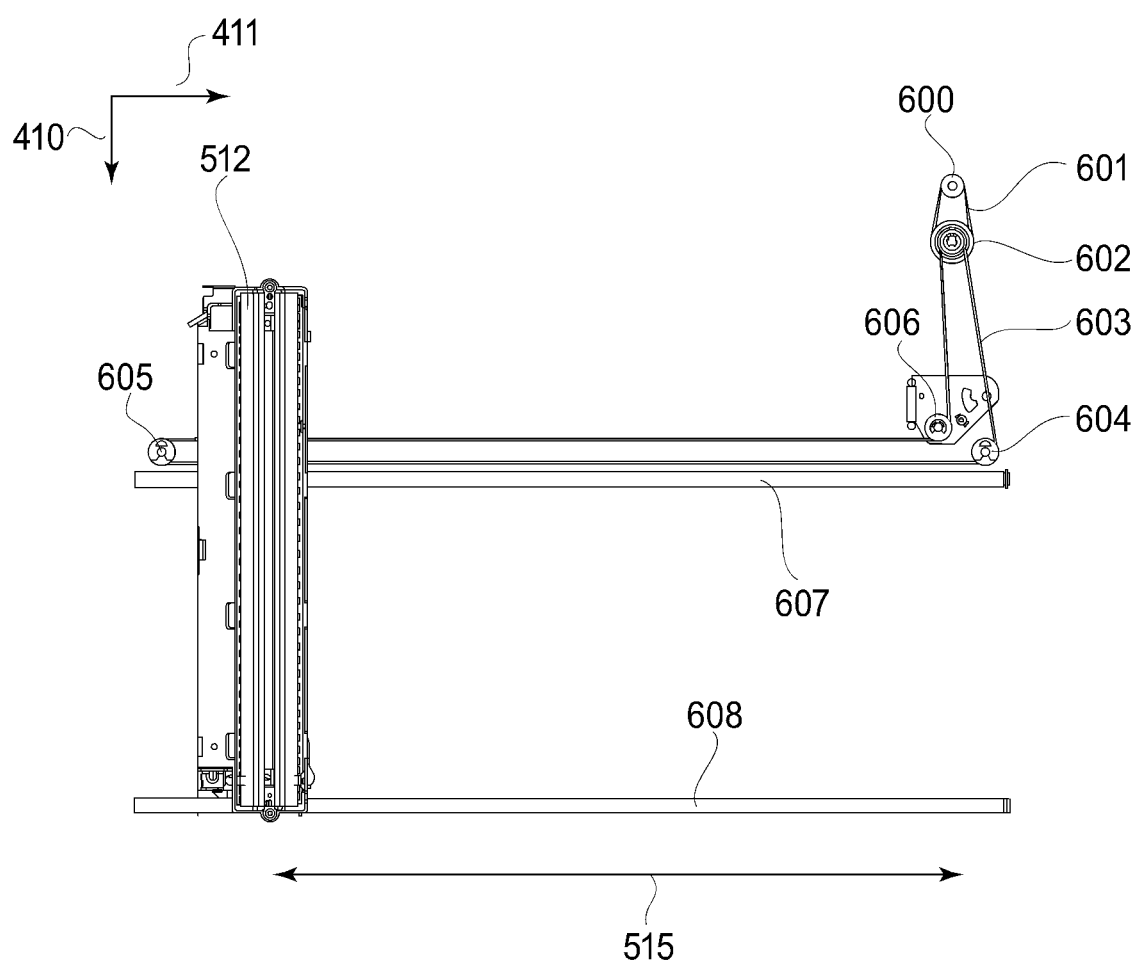
FIG. 5 is a top (plan) view showing a first image reading portion provided inside the reader and a driving constitution thereof.

FIG. 5 is a top (plan) view showing an example of the first image reading portion 512 provided inside the reader 301 and a drive constitution thereof.

Figure 6:
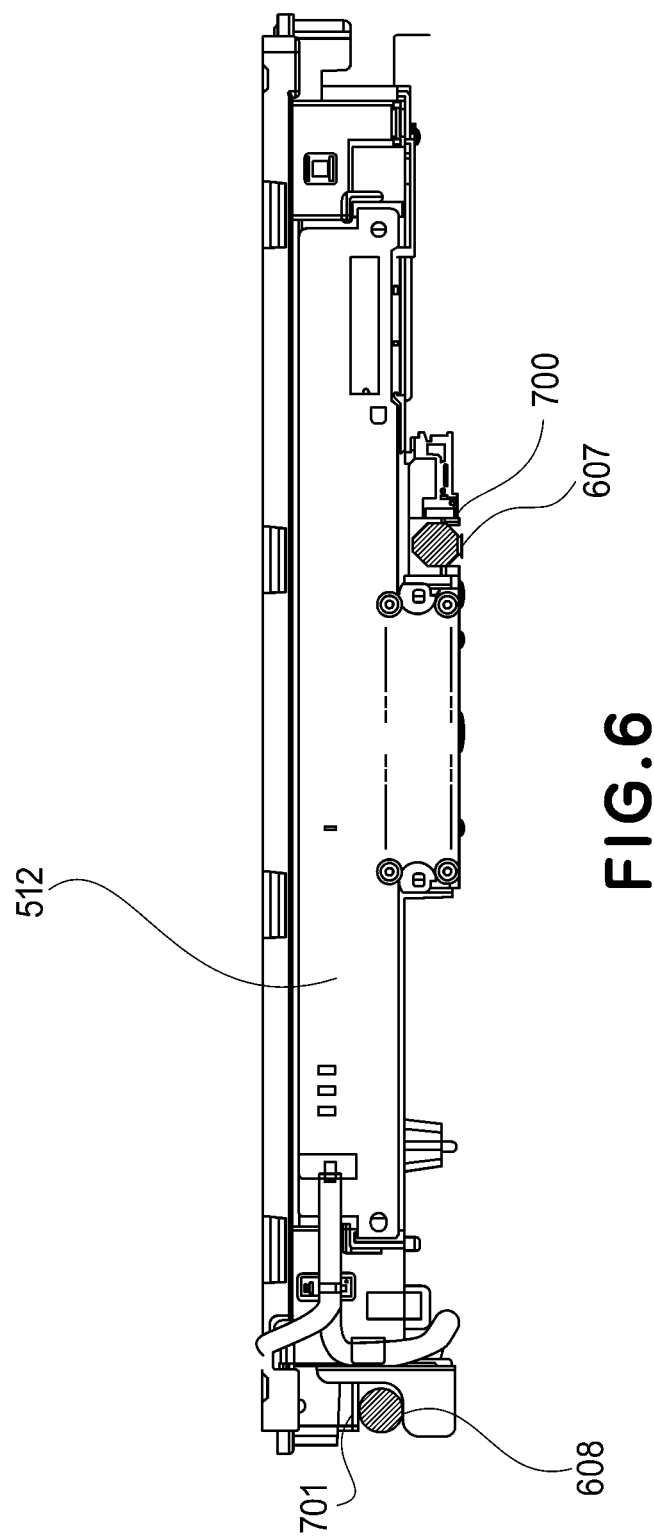
FIG. 6 is a right-side view of the first image reading portion.

FIG. 6 is a right-side view of the first image reading portion 512 showing a relationship between the first image reading portion 512, and a first supporting member 607 and a second supporting member 608. That is, this view corresponds to a view in which the first image reading portion 512 is viewed from the movement scanning direction 515 side of the first image reading portion 512.

In the following, using FIGS. 5 and 6, the drive constitution of the reader 301 which is a part of the image reading apparatus 201 of the present invention will be described.

Inside the reader 301, power is transmitted, to a two-step pulley 602, from a motor pulley 600 mounted on a shaft of an unshown motor which is a driving source via a first timing belt 601 so as to provide a necessary speed ratio. Then, the power is transmitted from the two-step pulley 602 to a second timing belt 603. The second timing belt 603 is stretched around a first idler pulley 604, a second idler pulley 605, and a tension pulley 606. The first idler pulley 604, the second idler pulley 605, and the tension pulley 606 are disposed so that the movement scanning direction 505 of the first image reading portion 512 and a movement direction of the second timing belt 603 are disposed in parallel to each other.

Further, as shown in FIGS. 5 and 6, a position of the first image reading portion 512 with respect to an up-down direction is supported by the first supporting member 607 and the second supporting member 608 which are provided inside the reader 301. In this embodiment, both the first supporting member 607 and the second supporting member 608 are cylindrical metal shafts, but are not limited thereto.

On a lower surface side of the first image reading portion 512, in a position corresponding to the first supporting member 607, a bearing portion 700 provided with a U-shaped engaging portion engaging with the first supporting member 607 is provided. Further, on the lower surface side of the first image reading portion 512, in a position corresponding to the second supporting member 608, a slider member 701 for sliding on the second supporting member 608 is provided. In this embodiment, the bearing portion 700 and the slider member 701 are formed of a highly slidable resin material such as POM so as to smoothly slide on the first supporting member 607 and the second supporting member 608, respectively.

Next, using FIGS. 7 to 10, a correcting method of an image reading result in this embodiment will be described.

Figure 7:
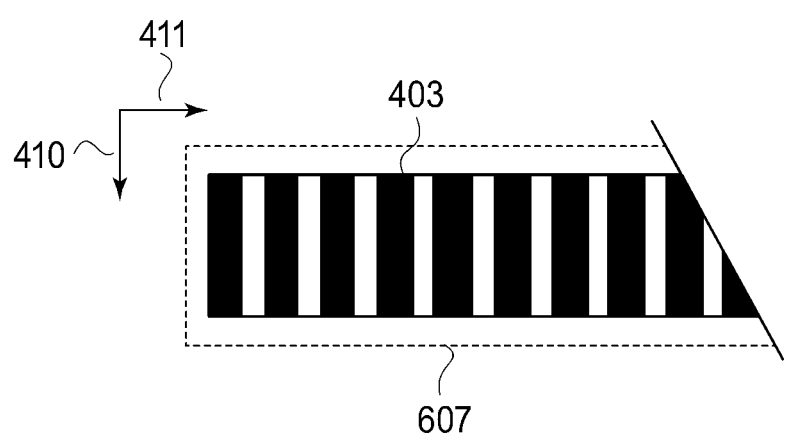
FIG. 7 is a schematic illustration showing a reference chart disposed outside an original reading region of the image reading apparatus.

FIG. 7 is a schematic view showing an example of a reference chart 403 as a pattern which is a reference of an image reading position in an arbitrary measuring position with respect to a main scan direction.

In this embodiment, the reference chart 403 is provided on a back side of an original scale 402 (FIG. 3) of the reader 301 with respect to the sub-scan direction, and can be read by movement scanning thereof by the first image reading portion 512.

The back side of the original scale 402 with respect to the sub-scan direction, which constitutes a measuring position of the reference chart 403 by the first image reading portion 512 is positioned outside an original reading region with respect to the main scan direction. For that reason, the first image reading portion 512 is capable of reading the reference chart 403 simultaneously with the image of the original without obstructing reading of the image of the original on the original supporting platen glass 401.

Further, the reference chart 503 is a line chart in which white and black rectilinear lines parallel to each other with respect to the main scan direction 410 are arranged alternately and equidistantly in the sub-scan direction 411 (movement scanning direction 515). By subtracting an actual inter-line distance from an inter-line distance calculated from a reading result of the white lines or the black lines of the reference chart 403, a deviation in reading result of the inter-line in the measuring position of the reference chart 403, i.e., a reading error can be calculated.

Here, line positions where an i-th white or black line and an (i+1)-th white or black line of the reference chart 403 are read are taken as l(i) and l(i+1), respectively, and actual line positions of the i-th white or black line and the (i+1)-th white or black line are taken as $l_0(i)$ and $l_0(i+1)$, respectively. Then, a reading error e(i) in the measuring position of the reference chart 403 can be represented by the following formula (1).

$$e(i)=l(i+1)-l(i)-\{l_0(i+1)-l_0(i)\} \quad (1)$$

Figure 8:
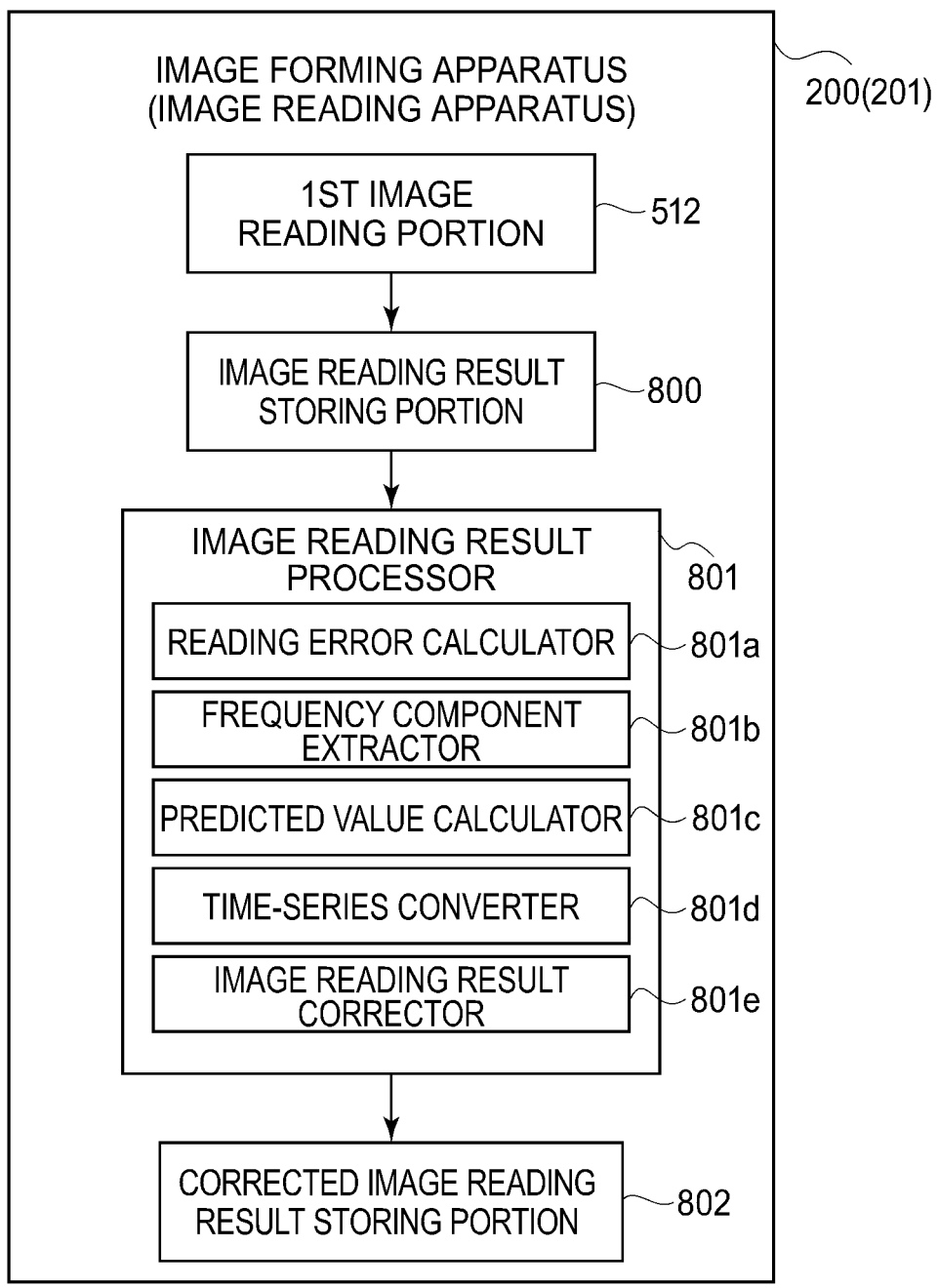
FIG. 8 is a schematic illustration showing a constitution for correcting a reading error of an image reading result in a first embodiment.

FIG. 8 is a schematic illustration showing an example of each of calculating portions (computation portions) in the image forming apparatus 200 or the image reading apparatus 201 in the first embodiment.

First, an image reading result read by the first image reading portion 512 is stored in an image reading result storing portion 800, and thereafter is sent to an image reading result processing portion (processor) 801. In the image reading result processing portion 801, the image reading result is subjected to processes by a reading error calculating portion (calculator) 801a, a frequency component extracting portion (extractor) 801b, a predicted value calculating portion (calculator) 801c, a time-series converting portion (converter) 801d, and an image reading result correcting portion (corrector) 801e, and then is stored in a corrected image reading result storing portion 802.

Incidentally, in FIG. 8, the image reading result storing portion 800 and the corrected image reading result storing portion 802 are shown as separate portions, but may also be a single portion. Further, the image reading result processing portion 801 may be realized by hardware or software. In this embodiment, a CPU in the image reading apparatus 201 or the image forming apparatus 200 including the image reading apparatus 201 read a program, stored in a ROM or the like, into a RAM as desired, and then executes the program, thus realizing the image reading result processing portion 801.

Figure 9:
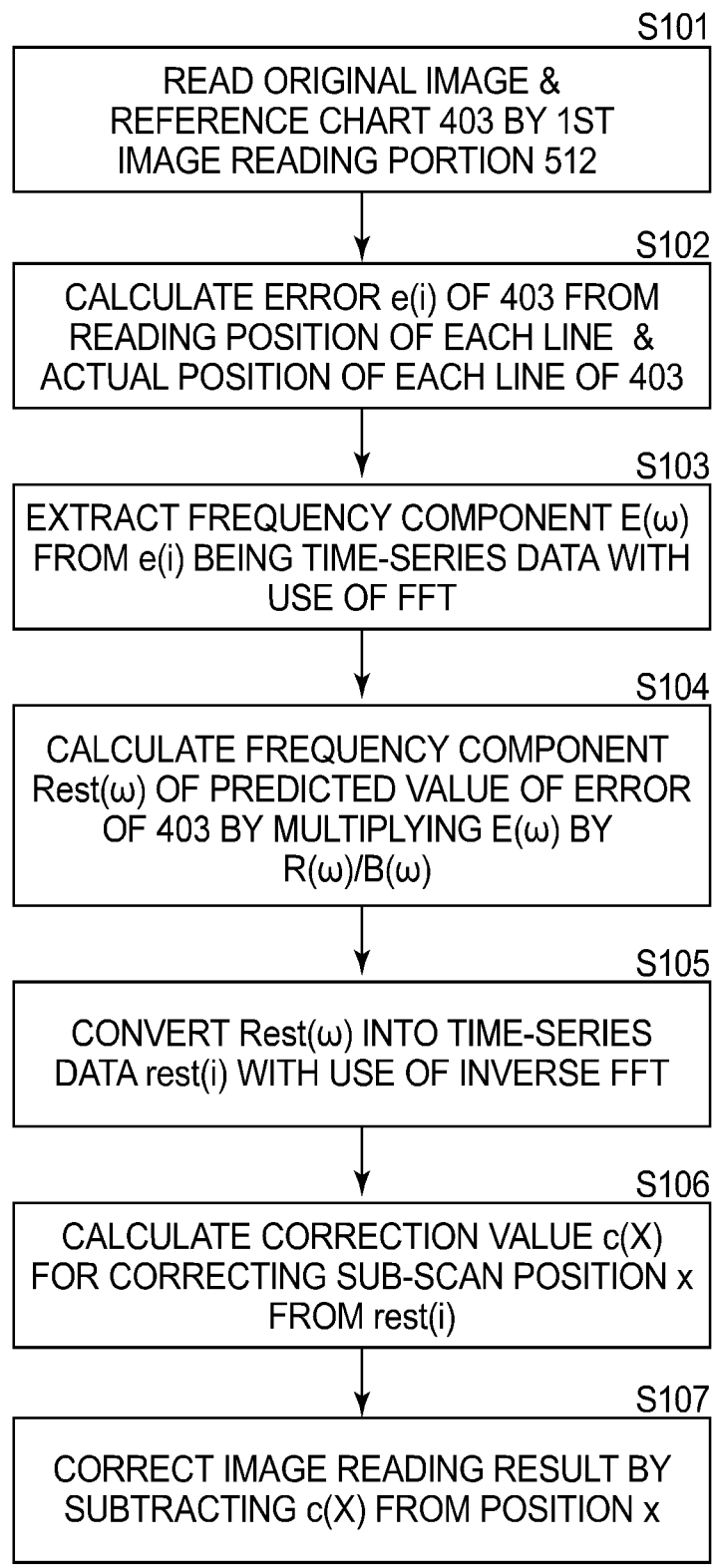
FIG. 9 is a flowchart showing a correcting process of the reading error in the first embodiment.

FIG. 8 is a flowchart showing an example of a correcting process of the reading error in the first embodiment. The process of this flowchart corresponds to a process from reading of the image of the original in a non-measurement position and reading of the reference chart 403 in a measurement position by the first image reading portion 512 until an image reading result in the non-measurement position is corrected. Incidentally, each of pieces of calculation and computation shown in FIG. 9 is carried out by an associated one of the calculating portions shown in FIG. 8, i.e., by the CPU in the image reading apparatus 201 or the image forming apparatus 200 including the image reading apparatus 201.

First, the first image reading portion 512 is moved and scanned by control of the CPU in the image reading apparatus 201 or the image forming apparatus 200, so that the image of the original in the non-measurement position and the reference chart 403 in the measurement position are read (S101). Then, the CPU in the image reading apparatus 201 or the image forming apparatus 200 stores read time-series data (image reading result) in the image reading result storing portion 800 of the image reading apparatus 201 or the image forming apparatus 200, and sends the read time-series data to the image reading result processing portion 801.

Next, the image reading result calculating portion 801a calculates (derives) the time-series data e(i) of the reading error of the reference chart 403 in accordance with the above-described formula (1) from the reading positions of the respective lines of the reference chart 403 and actual positions of the respective lines (S102).

Further, the frequency component extracting portion 801b extracts a frequency component E(ω) from the reading error e(i) calculated in the above-described S102 (S103). In this embodiment, as an extracting method, fast Fourier transformation (FFT) is used. Further, the time-series data e(i) which is a time-series component of the reading error is not necessarily required to be a time-base data, but may also be space-base data such as a reading error with respect to the sub-scan direction, for example.

Next, the predicted value calculating portion 801c multiplies the frequency component E(ω) of the reading error of the reference chart 403 by a frequency response R(ω)/B(ω) of a speed at the non-measurement position to a speed at the measurement position of the reference chart 403 in the first image reading portion 512. By this calculation (computation), a frequency component $R_{est}(\omega)$ of a predicted value of the reading error at the non-measurement position is acquired (S104).

Here, the above-described frequency response can be acquired by acquiring the frequency response of each of speeds of the first image reading portion 512 at the measurement position and the non-measurement position relative to a speed fluctuation of arbitrary input, for example, a speed fluctuation of a driving source and then by driving the frequency response at the non-measurement position by the frequency response at the measurement position. That is, when the frequency responses of the speeds of the first image reading portion 512 at the measurement position and at the non-measurement position relative to the arbitrary input are defined as B(ω) and R(ω), respectively, the frequency response of the speed at the non-measurement position to the speed at the measurement position can be acquired as R(ω)/B(ω). In this embodiment, the frequency response R(ω)/B(ω) is acquired by measurement or a simulation during product development or by measurement for each production in the factory or the like, and then is stored in the image forming apparatus 200 or the image reading apparatus 201 in advance. For example, this frequency response is stored in advance in the image reading result storing portion 800 of the image forming apparatus 200. By using this frequency response, the frequency component $R_{est}(\omega)$ of the predicted value of the reading error at the non-measurement position is calculated in accordance with the following formula (2).

$$R_{est}(\omega) = E(\omega) \cdot \frac{R(\omega)}{B(\omega)} \qquad (2)$$

Here, from the above-described formula (1), the reading error e(i) is calculated by a difference between the line reading positions l(i) and l(i+1) of the reference chart 403, and thus is a speed dimension. Therefore, in this embodiment, R(ω)/B(ω) is incorporated as the frequency response of the speed into calculation. As in the formula (2), by calculating the frequency component $R_{est}(\omega)$ of the predicted value of the reading error at the non-measurement position, the reading error at the same phase between the measurement position and the non-measurement position caused by translational vibration of the first image reading portion 512 with respect to the sub-scan direction can be converted while maintaining the same phase. Further, the reading error at the opposite phase (antiphase) between the measurement position and the non-measurement position caused by rotational vibration about the supporting point of the first image reading portion 512 can be converted while maintaining the opposite phase. Thus, the frequency component of the predicted value depending on the vibration of the first image reading portion 512 can be calculated.

Next, the time-series converting portion 801d converts the frequency component $R_{est}(\omega)$ of the predicted value of the reading error at the non-measurement position into time-series data $r_{est}(i)$ (S105). Here, in this embodiment, as a converting method, inverse FFT (inverse fast Fourier transformation) is used.

Then, the image reading result correcting portion 801e calculates correction value c(x) for correcting a sub-scanning position x of the image reading result at the non-measurement position by using the time-series data $r_{est}(i)$ which is the time-series component of the predicted value of the reading error at the non-measurement position (S106). In this embodiment, the correction value is calculated by using linear interpolation. That is, when the sub-scanning position x of the image reading result at the non-measurement position exists between the line reading positions l(i) and l(i+1) of the reference chart 403, the correction value c(x) is calculated in accordance with the following formula (3).

$$c(x) = \frac{r_{est}(i+1) - r_{est}(i)}{l(i+1) - l(i)} \cdot \{x - l(i)\} + r_{est}(i) \qquad (3)$$

Finally, the image reading result correcting portion 801e corrects the image reading result at the non-measurement position by subtracting the correction value c(x) from the sub-scanning position x of the image reading result at the non-measurement position (S107). In this embodiment, the image reading result corrected in the above-described S107 is stored in the corrected image reading result storing portion 802 of the image reading apparatus 201 or the image forming apparatus 200 by control of the CPU in the image reading apparatus 201 or the image forming apparatus 200.

Parts (a) to (f) are diagrams showing waveforms of respective data in the flowchart of FIG. 9.

Part (a) of FIG. 10 is an example of the time-series data e(i) of the reading error at the measurement position of the reference chart 403, calculated by the formula (1).

Part (b) of FIG. 10 is an example of the frequency component E(ω) of e(i) extracted by the FFT.

Part (c) of FIG. 10 is an example of the frequency response R(ω)/B(ω) from the speed at the measurement position to the speed at the non-measurement position.

Part (d) of FIG. 10 is an example of the frequency component $R_{est}(\omega)$ of the predicted value of the reading error at the non-measurement position, calculated by the formula (2).

Part (e) of FIG. 10 is an example of the time-series data $r_{est}(i)$ of $R_{est}(\omega)$ converted by the inverse FFT.

Part (f) of FIG. 10 shown an example of comparison between a correction residual in a conventional correcting method and a correction residual in the correcting method of this embodiment.

Here, the conventional correcting method is a method in which when the correction value c(x) is calculated, not the predicted value $r_{est}(u)$ of the reading error at the non-measurement position, the reading error e(i) of the reference chart 403 is used, and the correction value c(x) is calculated in accordance with the following formula (4).

$$c(x) = \frac{e(i+1) - e(i)}{l(i+1) - l(i)} \cdot \{x - l(i)\} + e(i) \quad (4)$$

From part (f) of FIG. 10, the following can be understood.

In the conventional correcting method, although a low-frequency vibration component of the reading error is removed, a high-frequency vibration component is rather worsened and remains as the correction residue. On the other hand, in the correcting method of this embodiment, it is understood that both the low-frequency vibration component and the high-frequency vibration component are remarkably removed and thus good reading accuracy is obtained.

As described above, in this embodiment, at one end portion out of the reading region of the original with respect to the main scan direction, the reference chart extending in the sub-scan direction is disposed, and the reading error derived from the reading result of the reference chart is removed from a reading result of an entire image of the original. At this time, for the reading result of the image of the original, the correction value depending on the frequency component of the reading error of the reference chart is derived, so that the error is removed. By this, the reading error caused by speed non-uniformity, vibration, and the like during movement scanning of the image reading portion can be effectively corrected, so that good reading accuracy can be obtained.

Incidentally, in this embodiment, although the position of the original scale 402 with respect to the sub-scan direction is the measuring position, but the position may only be required to be a predetermined position with respect to the main scan direction where the first image reading portion 512 is capable of reading the reference chart 403 together with the original, so that an arbitrary position with respect to the main scan direction can be taken as the measuring position. For example, an end portion on a side opposite to the original scale 402 with respect to the main scan direction may be taken as the measurement position.

In this case, a member in this position is provided with the reference chart 402, and when the first image reading portion 512 reads the original, together with the original, the reference chart 403 is made readable by the first image reading portion 512. Further, a constitution in which the image reading result processing portion 801 carries out the process at this measuring position is employed.

Second Embodiment

In the above-described first embodiment, the constitution in which the calculation and computation in the flowchart of FIG. 9 are performed by the CPU in the image reading apparatus 201 or the image forming apparatus 200 including the image reading apparatus 201 was described. However, the above-described calculation and computation are not necessarily be required to be performed by the image reading apparatus 201 and the image forming apparatus 200. In a second embodiment, as an example thereof, read data of the image of the original and the reference chart 403 at the measurement position by the first image reading portion 512 is sent to an external environment (for example, cloud or external PC) including a calculating portion. Then, a constitution in which the calculation and computation are performed by the external environment, and then the corrected image reading result of the original is sent to the image reading apparatus 201 or the image forming apparatus 200 will be described.

FIG. 11 is a schematic illustration showing an example of each of calculating portions (computation portions) in the image forming apparatus 200 or the image reading apparatus 201, and in an external environment 900 including the calculating portion in the second embodiment and data transfer between these portions.

First, an image reading result read by the first image reading portion 512 is stored in an image reading result storing portion 800, and thereafter is sent to the external environment 900 including the calculating portion by an image reading result sending portion (processor) 803. The external environment 900 corresponds to, for example, a cloud service or an external computer (PC, tablet terminal, smartphone, and the like), and in which a program corresponding to the calculating portion is installed and is operated in advance.

In the external environment 900, the image reading result is received from the image forming apparatus 200 or the image reading apparatus 201 by an external image reading result receiving portion 901, and then is sent to an external image reading result processing portion 902. In the external image reading result processing portion 902, the image reading result is subjected to processes by an external reading error calculating portion (calculator) 902a, an external frequency component extracting portion (extractor) 902b, an external predicted value calculating portion (calculator) 902c, an external time-series converting portion (converter) 902d, and an external image reading result correcting portion (corrector) 902e. The image reading result processed by the external image reading result processing portion 902 is sent, as a corrected image reading result, to the image forming apparatus 200 or the image reading apparatus 201 by an external sending portion 903 of the corrected image reading result. In the image forming apparatus 200 or the image reading apparatus 201, the corrected image reading result is received from the external environment 800 by the corrected image reading result receiving portion 804 and then is stored in the corrected image reading result storing portion 802.

Incidentally, the external image reading result processing portion 902 is realized in a manner such that a single or a plurality of CPUs in the external environment 900 reads a program, stored in a storing device, and then executes the program.

FIG. 9 is a flowchart showing an example of a correcting process of the reading error in an image forming position adjusting operation in the second embodiment. The process of this flowchart corresponds to a process from reading of the image of the original in a non-measurement position and reading of the reference chart 403 in a measurement position by the first image reading portion 512 until an image reading result in the non-measurement position is corrected in the external environment 900. Incidentally, each of pieces of calculation and computation shown in FIG. 12 is carried out by an associated one of the calculating portions shown in FIG. 11, i.e., by the CPU in the external environment 900.

First, the first image reading portion 512 is moved and scanned by control of the CPU in the image reading apparatus 201 or the image forming apparatus 200, so that the image of the original in the non-measurement position and the reference chart 403 in the measurement position are read (S201). Then, the CPU in the image reading apparatus 201 or the image forming apparatus 200 stores read time-series data (image reading result) in the image reading result storing portion 800 of the image reading apparatus 201 or the image forming apparatus 200, and delivers the read time-series data to the image reading result sending portion 803. The image reading result sending portion 803 sends the image reading result to the external environment 900 (S202).

On the external environment 900 side, the external image reading result receiving portion 901 receives the image reading result and sends the image reading result to the external image reading result processing portion 902. In the external image reading result processing portion 902, the received image reading result is subjected to processes shown in S203 to S208. That is, the image reading result of the original is corrected by the external image reading result calculating portion 902a, the external frequency component extracting portion 902b, the external predicted value calculating portion 902c, the external time-series converting portion 902d, and the external image reading result correcting portion 902e (S203 to S208). Incidentally, the processes of S203 to S209 are similar to the processes of S102 to S107 of FIG. 9, and therefore will be omitted from description.

Further, on the external environment 900 side, the image reading result of the original corrected by the above-described S203 to S208 is sent from the external corrected image reading result sending portion 903 to the image forming apparatus 200 or the image forming apparatus 201 (S209).

On the image forming apparatus 200 side or on the image reading apparatus 201 side, the corrected image reading result sent from the external environment 900 is received by the corrected image reading result is received by the corrected image reading result receiving portion 804, and is stored in the corrected image reading result storing portion 802. Incidentally, in FIG. 11, the image reading result storing portion 800 and the corrected image reading result storing portion 802 are separately illustrated, but these portions may also be a single portion.

In the above-described constitution, data obtained by reading the image of the original at the non-measurement position and the reference chart 403 at the measurement position are sent from the first image reading portion 512 to the external environment 900, and after the respective calculation and computation are carried out, the corrected image reading result of the original is received by the image reading apparatus 201 or the like. Incidentally, a constitution in which a scanner driver or a scan application operable in an information processing apparatus such as the personal computer (PC) provides a scanning instruction to the image reading apparatus 201 may also be employed.

In the case of this constitution, the image reading apparatus 201 reads the image of the original at the non-measurement position and the reference chart 403 at the measurement position by the first image reading portion 512 and sends the read data to the information processing apparatus. On the information processing apparatus side, the scanner driver or the scan application subjects the data, received from the image reading apparatus 201, to respective calculation and computation, and thus corrects the image reading result of the original. Then, the scanner driver or the scan application causes the storing portion such as the information processing apparatus to store, as an image file, the corrected image reading result of the original.

Incidentally, the information processing apparatus is not limited to the PC, but may also be another information processing apparatus such as the tablet terminal or the smartphone. Further, a constitution in which the corrected image reading result of the original is stored in a storing region of the cloud or another device may also be employed.

As described above, according to the second embodiment, the calculating portions are provided outside the image forming apparatus 200 or the image reading apparatus 201, whereby the correction in the present invention can be made without imposing a load on the CPU in the image forming apparatus 200 or the image reading apparatus 201. That is, even when specification of the CPU in the image forming apparatus 200 or the image reading apparatus 201 is low, it becomes possible to perform the correcting method in the present invention.

Third Embodiment

In the above-described first and second embodiments, the correcting method of the image reading result when an arbitrary original image is read was described. In a third embodiment, an applied case thereof will be described. Specifically, a measuring chart printed by the image forming apparatus 200 is read by the image reading apparatus 201, so that a deviation amount of an image forming position from an ideal position is derived, and the correcting method in the present invention is used in an image forming position adjusting operation in which the image forming position is adjusted depending on the deviation amount.

In the image forming position adjusting operation, ideally, it is desirable that only a pure deviation amount of the image forming position is derived. However, when the deviation amount of the image forming position from the ideal position is derived by reading the measuring chart in the image forming position adjusting operation, the reading error due to vibration or the like caused during movement scanning of the first image reading portion 512 is also included in the deviation amount.

Therefore, the measuring chart reading result in the image forming position adjusting operation is corrected by the correcting method in the present invention, so that a reading error component is removed. By this, when the deviation amount of the image forming position from the ideal position is derived in the image forming position adjusting operation, it is possible to prevent that the reading error due to vibration or the like caused during movement scanning of the first image reading portion 512 is included in the deviation amount. In the image forming position adjusting operation, the image forming position is adjusted on the basis of the deviation amount derived from the measuring chart deriving result. For this reason, removal of the reading error from the measuring chart reading result directly leads to improvement of adjustment accuracy of the image forming position, and thus is very significant.

FIG. 13 is a schematic illustration showing an example of a measuring chart 1000 printed by the image forming apparatus 200 when the image forming position adjusting operation in the third embodiment.

In the measuring chart 1000 in this embodiment, six reference patches 1001a to 1001f are printed (formed) as pattern images which constitute an image forming basis, by the image forming apparatus 200. The thus-printed measuring chart 1000 is placed on the original supporting platen glass 401 of the image reading apparatus 201, and is read by causing the first image reading portion 512 to read the measuring chart 1000 through the movement scanning. Further, on the basis of this reading result, the deviation amount of the image forming position is derived from a difference in gravity position of the reference patches 1001a to 1001f between the reading position and the ideal position, and then the image forming position is adjusted depending on the derived deviation amount.

Incidentally, in this embodiment, when the measuring chart 1000 is read by the first image reading portion 512, the measuring chart 1000 is placed on the original supporting platen glass 401 so that X direction (long side) becomes the sub-scan direction and Y direction (short side) becomes the main scan direction.

FIG. 14 is a flowchart showing an example of a correcting process of the reading error in the image forming position adjusting operation in the third embodiment. The process of this flowchart corresponds to a process from reading of the measuring chart 1000 in a non-measurement position and reading of the reference chart 403 in a measurement position by the first image reading portion 512 until the gravity position of the reference patches of the measuring chart 1000 is corrected. In the following, description will be made on the assumption that each of pieces of calculation and computation shown in FIG. 14 is carried out by an associated one of the calculating portions shown in FIG. 8, i.e., by the CPU in the image reading apparatus 201 or the image forming apparatus 200. However, a constitution in which each of pieces of calculation and computation shown in FIG. 14 is carried out by an associated one of the calculating portions shown in FIG. 11, i.e., by the CPU in the external environment 900 may also be employed.

First, by the CPU in the image forming apparatus 200, the image forming apparatus 200 prints the measuring chart 1000 (S301).

Then, the first image reading portion 512 is moved and scanned by control of the CPU in the image reading apparatus 201 or the image forming apparatus 200, so that the measuring chart 1000 in the non-measurement position and the reference chart 403 in the measurement position are read (S302). Then, the CPU in the image reading apparatus 201 or the image forming apparatus 200 stores read time-series data (image reading result) in the image reading result storing portion 800 of the image reading apparatus 201 or the image forming apparatus 200, and sends the read time-series data to the image reading result processing portion 801.

Next, the image reading result calculating portion 801a calculates the time-series data e(i) of the reading error from the reading positions of the respective lines of the reference chart 403 and actual positions of the respective lines (S303).

Further, the frequency component extracting portion 801b extracts a frequency component E($\omega$) from the reading error e(i) calculated in the above-described S303 (S304). S303 and S304 are similar to S102 and S103 of FIG. 9, and therefore will be omitted from detailed description.

Next, the predicted value calculating portion 801c acquires gravity positions ($g_{ax}$, $g_{ay}$) of the reference patch 1001a from the reading result of the measuring chart 1000 (S305). Here, $g_{ax}$ is the position with respect to the sub-scan direction, and $g_{ay}$ is the position with respect to the main scan direction.

Here, a frequency response of a speed of Y coordinate (main scan direction) $g_{ay}$ at the gravity position of the reference patch 1001a relative to a speed at the measuring position of the reference chart 403 in the first image reading portion 512 is taken as $R_a(\omega)/B(\omega)$. The predicted value calculating portion 801c multiples the frequency component E($\omega$) of the reading error of the reference chart 403 by the frequency response $R_a(\omega)B(\omega)$. By this calculation, a frequency component $R_{a\text{-}est}(\omega)$ of the predicted value of the reading error in the Y coordinate (main scan direction) $g_{ay}$ of the gravity position of the reference patch 1001a is acquired (S306).

Next, the time-series converting portion 801d converts the frequency component $R_{a\text{-}est}(\omega)$ of the predicted value of the reading error in the Y coordinate (main scan direction) $8_{ay}$ at the gravity position of the reference patch 1001a into time-series data $r_{a\text{-}est}(i)$ (S307). Here, in this embodiment, as a converting method, inverse FFT (inverse fast Fourier transformation) is used.

Then, the image reading result correcting portion 801e calculates correction value $c_a(x)$ for correcting the X coordinate (sub-scanning position) $g_{ax}$ at the gravity position of the reference patch 1001a by using the time-series data $r_{a\text{-}est}(i)$ which is the time-series component of the predicted value of the reading error at the non-measurement position (S308).

Finally, the image reading result correcting portion 801e corrects the gravity position of the reference patch 1001a by subtracting the correction value $c_a(x)$ from the X coordinate (sub-scanning position) $g_{ax}$ at the gravity position of the reference patch 1001a (S309).

The above-described pieces of calculation of S305 to S309 are similarly carried out for the reference patches 1001b to 1001f, whereby the reading errors of gravity positions of all the reference patches 1001a to 1001f can be removed.

Here, as regards the frequency response in the above-described S306, there is no need that frequency responses $R_a(\omega)$ to $R_f(\omega)/B(\omega)$ corresponding to the six reference patches 1001a to 100'f, respectively, are always separately stored in a memory. For example, in this embodiment, Y direction (main scan direction) positions of the reference patches 1001a to 1001c are substantially the same, and therefore, the frequency responses corresponding to these patches 1001a to 1001c would be considered to satisfy the following formula (5).

$$\frac{R_a(\omega)}{B(\omega)} = \frac{R_b(\omega)}{B(\omega)} = \frac{R_c(\omega)}{B(\omega)} \tag{5}$$

Similarly, Y direction (main scan direction) positions of the reference patches 1001d to 1001f are substantially the same, and therefore, the frequency responses corresponding to these patches 1001*d* to 1001*f* would be considered to satisfy the following formula (6).

$$\frac{R_d(\omega)}{B(\omega)} = \frac{R_e(\omega)}{B(\omega)} = \frac{R_f(\omega)}{B(\omega)} \quad (6)$$

Therefore, the frequency responses to be stored may only be two kinds for the reference patches 1001*a* to 1001*e* and for the reference patches 1001*d* to 1001*f*.

Further, in the case where the frequency response in the above-described S306 can be represented by a function of the main scan direction position, the frequency response to be stored may only be a single kind.

For example, at a frequency where translational vibration of the first image reading portion 512 occurs, an amplitude and a phase are substantially the same irrespective of the main scan direction position. On the other hand, at a frequency where rotational vibration about the supporting point of the first image reading portion 512 occurs, the amplitude changes depending on a main scan direction distance from the supporting point. That is, when the frequency response in a certain main scan direction position y is H($\omega$, y), the frequency response can be represented by the following formula (7).

$$H(\omega, y) = \frac{R_o(\omega)}{B(\omega)} \cdot K(\omega, y) \quad (7)$$

Here, $R_O(\omega)/B(\omega)$ is a reference frequency response, and $R_O(\omega)$ may desirably be a speed reference response of the first image reading portion 512 in a position on the other end side with respect to the main scan direction relative to the reference chart 403. Further, K($\omega$, y) is a coefficient changing depending on the frequency and the main scan direction position.

As described above, in the third embodiment, the read image of the measuring chart in the image forming position adjusting operation is corrected using the reading error correcting process in the present invention. By this, the influence of the reading error due to the vibration or the like caused during the movement scanning of the first image reading portion for reading the measuring chart in the image forming position adjusting operation is eliminated, and the deviation amount of the image forming position is derived (detected) with accuracy, so that the image forming position adjusting operation with accuracy can be performed.

Incidentally, a technique of this embodiment can be utilized not only for the image forming position adjustment of the image forming apparatus but also for inspection of a print printed by the image forming apparatus. By utilizing this embodiment for the inspection of the print printed by the image forming apparatus, positional deviation or the like of the print can be accurately detected, so that it becomes possible to make the inspection. For example, an excellent effect on the inspection or the like of the print printed by the image forming apparatus for commercial printing can be expected.

Fourth Embodiment

In the above-described third embodiment, the reading error correcting method in the image forming position adjusting operation when the first image reading portion 512 reads the measuring chart 1000 through the movement scanning was described, but the case where the first image reading portion 512 reads the measuring chart 1000 through the movement scanning is not necessarily required.

For example, the reading error correcting method in the present invention is also applicable to the reading error due to vibration of the first image reading portion 512 when a surface image of a skimming-through measuring chart, fed by the ADF 300 described below, in a state in which the first image reading portion 512 is at rest. In the following, this will be described in detail.

FIG. 15 is a schematic illustration showing an example of the skimming-through measuring chart printed by the image forming apparatus 200 when the image forming position adjusting operation in the fourth embodiment is performed.

In this embodiment, when a skimming-through measuring chart 1100 is printed, a sheet on which a skimming-through reference chart 1102 is printed in advance is subjected to printing of skimming-through reference patches 1101*a* to 1101*f* by the image forming apparatus 200. The skimming-through reference chart 1102 printed in advance is such that similarly as the reference chart 403 shown in FIG. 7, white and black rectilinear lines parallel to the main scan direction are alternately and equidistantly arranged with respect to the sub-scan direction.

The reason why the sheet on which the skimming-through reference chart 1102 is printed in advance is used is as follows. When the skimming-through reference chart 1102 is printed by the image forming apparatus 200, an equidistant chart cannot be obtained due to a deviation of the image forming position caused by the image forming apparatus 200, and thus the reading error cannot be accurately calculated. For this reason, the skimming-through reference chart 1102 is printed in advance by a means which does not cause the deviation of the image forming position.

Incidentally, the skimming-through reference patches 1101*a* to 1101*f* are similar to the reference patches 1001*a* to 1001*f* shown in FIG. 13, respectively.

The skimming-through measuring chart 1100 printed as described above is placed on the sheet feeding tray 302 in a state in which a printed surface thereof faces upward so that the X direction (long side) is the feeding direction, and is fed using the ADF 300. At this time, the skimming-through reference patches 1101*a* to 1101*f* and the skimming-through reference chart 1102 are read by the first image reading portion 512 which is at rest. Incidentally, a reading position of the skimming-through reference chart 1102 with respect to the main scan direction is the measurement position, and reading position of the skimming-through reference patches 1101*a* to 1101*f* are the non-measurement positions. In this embodiment, the image reading result correcting method is similar to the image reading result correcting method in the third embodiment, and therefore will be omitted from description.

Incidentally, in this embodiment, the case where the skimming-through measuring chart 1100 is read using the first image reading portion 512 was described. However, a similar method can also be used in the case where the skimming-through measuring chart 1100 is read using the second image reading portion 513.

Further, even in an image reading apparatus provided with no reference chart 403, the first image reading portion 512 reads the skimming-through measuring chart 1100 through the movement scanning, so that a similar method can be used.

As described above, in the fourth embodiment, the read image of the measuring chart, on which the skimming-through measuring chart is printed in advance, read by a skimming-through manner in the image forming position adjusting operation is corrected using the reading error correcting process in the present invention. By this, the influence of the reading error due to the vibration or the like caused when the measuring chart is read by the skimming-through manner in the image forming position adjusting operation is eliminated, so that it becomes possible to perform the image forming position adjustment with accuracy.

Fifth Embodiment

In a fifth embodiment, a constitution in which a reading result of the original read by the image reading apparatus provided with no reference chart 403 is subjected to the correcting method in the present invention will be described.

Parts (a) to (c) of FIG. 16 are schematic views for illustrating a reading method of the original in the fifth embodiment.

A reference sheet 1600 shown in part (a) of FIG. 16 is a band-like sheet on which a reference chart 1699 (similar to the above-described reference chart 403) is printed in advance by a means which does not cause the image forming position deviation. In this embodiment, as shown in parts (b) and (c) of FIG. 16, the reference sheet 1600 is set downward together with an original 1603 on the original supporting platen glass 401, and are read by an instruction from the scanner driver or the scan application which are operable in the PC or the like. Thus, the reference chart 1699 is placed on the original supporting platen glass 401, so that the reference chart 1699 constitutes a line chart in which white and black rectilinear line images parallel to the main scan direction are alternately and equidistantly arranged with respect to the sub-scan direction. By this, the first image reading portion 512 is capable of reading the image of the reference chart 1699 together with the original 603.

Part (b) of FIG. 16 is the schematic view showing an example of the state in which the reference sheet 1600 and the original 1603 are set downward on the original supporting platen glass 401.

Part (c) of FIG. 16 is the schematic view showing an example of a state in which the original supporting platen glass 401 on which the reference sheet 1600 and the original 1603 were set downward is viewed from a back side (lower side) of the original supporting platen glass 401, i.e., from the first image reading portion 512 side.

In this embodiment, the measurement position and the non-measurement position in the main scan direction will be described as a measurement position 1601 and a non-measurement position 1602, respectively, shown in parts (b) and (c) of FIG. 16. A user sets downward the reference sheet 1600 in the measurement position 1601 and the original 1603 in the non-measurement position 1602, and then reading thereof is carried out. This is an example, and the measurement position where the reference sheet 1600 is set and the non-measurement position where the original 1603 is set are not limited thereto. Incidentally, these positions may be fixed positions determined in advance or may also be settable by the user for the scanner driver or the scan application or the like which are openable in the information processing apparatus.

FIG. 17 is a schematic illustration showing an example of each of calculating portions (computation portions) in the image forming apparatus 200 or the image reading apparatus 201, and in an information processing apparatus 1700 including the calculating portion in the fifth embodiment and data transfer between these portions. Incidentally, constituent portions 1701 to 1703 shown in the information processing apparatus 1700 are realized and caused to function by reading and executing the scanner driver or the scan application, stored in the storing device, by the CPU in the information processing apparatus 1700. The information processing apparatus 1700 is not limited to the PC, but may also be another image forming apparatus such as a tablet terminal or a smartphone.

First, an image reading instructing portion 1701 in the information processing apparatus 1700 sends an image reading instruction to the image reading apparatus 201 or the image forming apparatus 200. Incidentally, in the scanner driver or the scan application which are operable in the above-described information processing apparatus 1700, the measurement position 1601 as shown in part (b) of FIG. 16 is set in advance. Further, the user designates a size (for example, "A4") and a file format (for example, "JPEG") of the original to be read for the scanner driver or the scan application. Then, as shown in parts (b) and (c) of FIG. 16, the user sets the reference sheet 1600 and the original 1603 and provides a reading instruction.

The image reading instructing portion 1701 provides an instruction to read an image including the reference sheet 1600 and the original 1603 shown in part (b) of FIG. 16 in the above-described image reading instruction. Incidentally, with respect to the main scan direction, there is a need to read the image including the reference sheet 1600 and the original 1603, but with respect to the sub-scan direction, there is no need to read entirety of the reference sheet 1600 and a region including the original 1603 may only be required to be read. For this reason, in the above-described image reading instruction, with respect to the sub-scan direction, the instruction is provided so that the reading is made in a size corresponding to the size of the original 1603.

This image reading instruction is received by an image reading instruction receiving portion in the image reading apparatus 201 or the image forming apparatus 200, and the first image reading portion 502 reads the image depending on the received instruction. An image reading result of the image read by the first image reading portion 502 is sent to the information processing apparatus 1700 by the image reading result sending portion 803. In the information processing apparatus 1700, the image reading result is received by an image reading result receiving portion 1702, and is sent to an image reading result processing portion 1703 by the image reading result receiving portion 1702.

In the image reading result processing portion 1703, the image reading result is corrected by being processed by a reading error calculating portion 1703a, a frequency component extracting portion 1703b, a predicted value calculating portion 1703c, a time-series converting portion 1703d, and an image reading result correcting portion 1703e. Incidentally, in this embodiment, a frequency response $R(\omega)/B(\omega)$ used by the predicted value calculating portion 1703c is distributed together with the scanner driver or the scan application, for example, by acquiring calculation or simulation for each kind (model) of the image reading apparatus 201. This is stored in the storing device of the information processing apparatus 1700 in advance.

The image reading result processed by the image reading result processing portion 1703 is stored as a corrected image reading result in a corrected image reading result storing portion 1704. At this time, the scanner driver or the scan application cuts and stores the image reading result corresponding to the original on the basis of the above-described size of the original. Incidentally, the corrected image reading result storing portion 1704 may also be cloud or a storing portion of another device, not the storing region in the information processing apparatus 1700.

FIG. 17 is a flowchart showing an example of a correcting process of the reading error in the fifth embodiment. The process of this flowchart corresponds to a process from sending of the image reading instruction from the information processing apparatus 1700 to the image reading apparatus 201, and reading of the reference chart 1699 and the image of the original by the first image reading portion 512 until an image reading result of the original is corrected. Incidentally, each of pieces of calculation and computation shown in FIG. 18 is carried out by an associated one of the calculating portions shown in FIG. 17, i.e., by the CPU in the information processing apparatus 1700.

First, the image reading instructing portion 1701 in the information processing apparatus 1700 sends the image reading instruction into the image reading apparatus 201 or the image forming apparatus 200 (S1801).

The CPU in the image reading apparatus 201 or the image forming apparatus 200 controls the first image reading portion 512, in accordance with the above-described image reading instruction, so as to read the reference chart 1699 and the image of the original by moving and scanning the first image reading portion 512 (S1802). Then, the CPU in the image reading apparatus 201 or the image forming apparatus 200 delivers read time-series data (image reading result) to the image reading result sending portion 803. The image reading result second portion 803 sends the image reading result to the information processing apparatus 1700 (S1803).

On the information processing apparatus 1700 side, the image reading result receiving portion 1702 receives the image reading result and sends the image reading result to the image reading result processing portion 1703. In the image reading result processing portion 1703, the processes shown in S1804 to S1809 are carried out using the received image reading result in the measurement position and the received image reading result in the non-measurement position. That is, the image reading result in a non-measurement region is corrected by the image reading result calculating portion 1703a, the frequency component extracting portion 1703b, the predicted value calculating portion 1703c, the time-series converting portion 1703d, and the image reading result correcting portion 1703e (S1804 to S1809). Incidentally, the processes of S1804 to S1809 are similar to the processes of S102 to S107 of FIG. 9, and therefore will be omitted from description.

Further, on the information processing apparatus 1700 side, the image reading result corrected by the above-described S1804 to S1809 is stored in the corrected image reading result storing portion 1704 (S1810). At this time, on the basis of the above-described size of the original, as desired, the scanner driver or the scan application cut the image reading result corresponding to the original from the corrected image reading result, and the cut image reading result is stored as an image file in a designated format. Incidentally, the corrected image reading result storing portion 1704 may also be cloud or a storing region of another device, not the storing region in the information processing apparatus 1700.

As described above, according to the fifth embodiment, it becomes possible to subject the image reading result read by the image reading apparatus such that the reference chart 403 is not provided, to the correcting process in the present invention.

As described above, in the above-described embodiments, the constitution in which for the image reading result of the original, the correction value depending on the frequency component of the reading error of the reference chart is derived and removed is employed. By this constitution, it becomes possible to effectively correct the reading error caused by the speed non-uniformity or the vibration or the like during the movement scanning of the image reading portion, so that good reading accuracy can be obtained.

Incidentally, constitutions and contents of the above-described various data are not limited to those described above, but may also be carious constitutions and contents depending on uses and purposes.

As described above, one form of the present invention was described, but the present invention can also be carried out in various forms, such as a system, a device, a method, a program, and a storing medium. Specifically, the present invention may be applied to a system constituted by a plurality of devices, and may also be applied to an apparatus consisting of a single device.

Further, all the constitution including combinations of the above-described embodiments are braced in the present invention.

OTHER EMBODIMENTS

The present invention can be realized by a process in which a program for realizing one or more functions of the above-described embodiments is supplied to the system or the device by way of a network or a storing medium and then one or more processors in the system or the device reads and executes the program. Further, the present invention can also be realized by a circuit (for example, ASIC) for realizing one or more functions.

Further, the present invention may be applied to a system constituted by a plurality of devices and an apparatus consisting of a single device.

The present invention is not limited to the above-described embodiments and can be variously modified (including organic combinations of the respective embodiments) on the basis of the object of the present invention, and such modifications are not excluded from the scope of the present invention. That is, all the constitutions in which the above-described embodiments and their modified embodiments are combined falls under the present invention.

According to the present invention, the reading error caused by the speed non-uniformity or the vibration or the like during the movement scanning of the image reading means can be effectively corrected. By this, it becomes possible to obtain good reading accuracy.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-060506 filed on Mar. 31, 2021, which is hereby incorporated by reference herein in its entirety.

What is claimed is:

1. An image reading apparatus comprising:
a transparent member on which an original is placed;
reading means configured to read an image of the original by scanning the original placed on said transparent member while moving the original in a first direction;
a pattern provided in a position in which said reading means is capable of reading an image thereof in a second direction crossing the first direction and outside a region in which the original is placed; and a processor configured to:

extract a frequency component in the image of said pattern read by said reading means in a period in which said reading means reads the image of the original placed on said transparent member while moving in the first direction;

calculate a frequency component from the extracted frequency component in another position different from said position, in which said pattern is provided, with respect to the second direction;

convert the calculated frequency component in said another position into a time-series component; and correct an image corresponding to said another position by using the converted time-series component in said another position.

2. An image reading apparatus according to claim 1, wherein the frequency component in said another position is calculated by multiplying a frequency component corresponding to the position in which said pattern provided by frequency response corresponding to said another position set in advance.

3. An image reading apparatus according to claim 1, wherein said processor calculates the frequency component in the image of said pattern by Fourier transformation, and
wherein said processor converts the calculated frequency component in said another position into the time-series component by inverse Fourier transformation.

4. An image reading apparatus according to claim 1, wherein said pattern is a pattern such that rectilinear lines parallel in the second direction and equidistantly arranged in the second direction.

5. An image reading apparatus according to claim 1, wherein said pattern is provided in a casing of said image reading apparatus.

* * * * *